(12) United States Patent
Klicpera

(10) Patent No.: US 11,095,960 B2
(45) Date of Patent: Aug. 17, 2021

(54) WATER METER AND LEAK DETECTION SYSTEM HAVING COMMUNICATION WITH A INTELLIGENT CENTRAL HUB LISTENING AND SPEAKING APPARATUS, WIRELESS THERMOSTAT AND/OR HOME AUTOMATION SYSTEM

(71) Applicant: Michael Edward Klicpera, La Jolla, CA (US)

(72) Inventor: Michael Edward Klicpera, La Jolla, CA (US)

( * ) Notice: Subject to any disclaimer, the term of this patent is extended or adjusted under 35 U.S.C. 154(b) by 0 days.

(21) Appl. No.: 16/295,396

(22) Filed: Mar. 7, 2019

(65) Prior Publication Data

US 2019/0281371 A1 Sep. 12, 2019

Related U.S. Application Data

(60) Provisional application No. 62/795,529, filed on Jan. 22, 2019, provisional application No. 62/639,935, filed on Mar. 7, 2018.

(51) Int. Cl.
*G01M 3/32* (2006.01)
*H04Q 9/00* (2006.01)
(Continued)

(52) U.S. Cl.
CPC ............ *H04Q 9/02* (2013.01); *G01M 3/3254* (2013.01); *G06F 3/167* (2013.01); *G10L 13/02* (2013.01);
(Continued)

(58) Field of Classification Search
None
See application file for complete search history.

(56) References Cited

U.S. PATENT DOCUMENTS

| 2,283,525 A | 5/1942 | Witham |
| 5,284,523 A | 2/1994 | Badami et al. |

(Continued)

*Primary Examiner* — Curtis A Kuntz
*Assistant Examiner* — Jerold B Murphy
(74) *Attorney, Agent, or Firm* — Michael Edward Klicpera

(57) ABSTRACT

The present invention comprises a water meter and leak detection system with a collection node and optional remotely located communication hub. The collection node is attached to a water supply within a public or private building with wireless or wire capability to communicate with one or more remote communication hubs, routers or other wireless equipment that provide internet access. A cell phone or smart phone or other remote display and/or recording apparatus is available for viewing water parameter data by the commercial owner, occupier or home/apartment/condominium resident. The water use and water energy use monitoring water meter and leak detection system collection node that includes a CPU/microprocessor/microcontroller, water flow sensor, wireless low power long-range type wireless communication means and power source, an antenna and optionally includes a power generation module, a pressure sensor for detecting small leak conditions, a temperature sensor, and one or more water quality sensors. The present invention water meter and leak detection system can communication with audio central hub having intelligent listening and speaker, wireless thermostats, and home automation and control technology.

21 Claims, 13 Drawing Sheets

(51) Int. Cl.
  *G06F 3/16* (2006.01)
  *G10L 15/22* (2006.01)
  *H04Q 9/02* (2006.01)
  *H04L 12/28* (2006.01)
  *G10L 13/02* (2013.01)
  *H04W 4/80* (2018.01)

(52) U.S. Cl.
  CPC .......... *G10L 15/22* (2013.01); *H04L 12/2827* (2013.01); *H04W 4/80* (2018.02); *G10L 2015/223* (2013.01)

(56) References Cited

U.S. PATENT DOCUMENTS

| | | | |
|---|---|---|---|
| 5,580,791 A | 12/1996 | Thorpe | |
| 5,660,198 A | 8/1997 | McClaran | |
| 5,719,564 A | 2/1998 | Sears | |
| 5,971,011 A | 10/1999 | Price | |
| 6,105,607 A | 8/2000 | Caise | |
| 6,181,257 B1 | 1/2001 | Meek | |
| 6,246,677 B1 | 6/2001 | Nap | |
| 6,397,687 B1 | 6/2002 | Gamas | |
| 6,539,968 B1 | 4/2003 | White | |
| 6,543,479 B2 | 4/2003 | Coffee. | |
| 6,556,142 B2 | 4/2003 | Dunstan | |
| 7,012,546 B1 | 3/2006 | Zigdon | |
| 7,103,511 B2 | 9/2006 | Petite | |
| 7,124,452 B1 | 10/2006 | Bauza | |
| 7,360,413 B2 | 8/2008 | Jeffries et al. | |
| 7,605,717 B2 | 10/2009 | Olson | |
| 7,626,511 B2 | 12/2009 | Lazar | |
| 7,711,796 B2 | 5/2010 | Gutt et al. | |
| 8,013,732 B2 | 9/2011 | Petite | |
| 8,073,931 B2 | 12/2011 | Dawes et al. | |
| 8,086,702 B2 | 12/2011 | Baum et al. | |
| 8,086,703 B2 | 12/2011 | Baum et al. | |
| 8,122,131 B2 | 2/2012 | Baum et al. | |
| 8,209,400 B2 | 6/2012 | Baum et al. | |
| 8,214,496 B2 | 7/2012 | Gutt et al. | |
| 8,217,804 B2 | 7/2012 | Laughlin-Parker | |
| 8,269,651 B2 | 9/2012 | Zigdon | |
| 8,335,842 B2 | 12/2012 | Raji et al. | |
| 8,451,986 B2 | 5/2013 | Cohn et al. | |
| 8,473,619 B2 | 6/2013 | Baum et al. | |
| 8,477,011 B2 | 7/2013 | Tubb et al. | |
| 8,478,844 B2 | 7/2013 | Baum et al. | |
| 8,478,871 B2 | 7/2013 | Gutt et al. | |
| 8,539,827 B2 | 9/2013 | Benson | |
| 8,602,384 B2 | 12/2013 | Williamson | |
| 8,612,591 B2 | 12/2013 | Dawes et al. | |
| 8,621,206 B2 | 12/2013 | Chang | |
| 8,625,722 B2 | 1/2014 | Rouquette | |
| 8,635,499 B2 | 1/2014 | Cohn et al. | |
| 8,638,211 B2 | 1/2014 | Cohn et al. | |
| 8,644,804 B2 | 2/2014 | Blackwell | |
| 8,713,132 B2 | 4/2014 | Baum et al. | |
| 8,819,178 B2 | 8/2014 | Baum et al. | |
| 8,825,871 B2 | 9/2014 | Baum et al. | |
| 8,833,390 B2 | 9/2014 | Ball | |
| 8,836,467 B1 | 9/2014 | Cohn et al. | |
| 8,878,690 B2 | 11/2014 | Olson | |
| 8,963,713 B2 | 2/2015 | Dawes et al. | |
| 8,988,221 B2 | 3/2015 | Raji et al. | |
| 8,996,665 B2 | 3/2015 | Baum et al. | |
| 9,019,120 B2 | 4/2015 | Broniak | |
| 9,047,753 B2 | 6/2015 | Dawes et al. | |
| 9,059,863 B2 | 6/2015 | Baum et al. | |
| 9,100,446 B2 | 8/2015 | Cohn et al. | |
| 9,141,276 B2 | 9/2015 | Dawes et al. | |
| 9,144,143 B2 | 9/2015 | Raji et al. | |
| 9,147,337 B2 | 9/2015 | Cohn et al. | |
| 9,172,553 B2 | 10/2015 | Dawes et al. | |
| 9,253,754 B2 | 2/2016 | Sanderford | |
| 2003/0210151 A1 | 11/2003 | Kimberlain et al. | |
| 2003/0227387 A1 | 12/2003 | Kimberlain et al. | |
| 2003/0233885 A1 | 12/2003 | Bird et al. | |
| 2004/0069345 A1 | 4/2004 | Doan | |
| 2004/0193329 A1 | 9/2004 | Ransom | |
| 2005/0065755 A1 | 3/2005 | Mccarter et al. | |
| 2006/0119488 A1* | 6/2006 | Hoiness | H04Q 9/00 340/870.02 |
| 2008/0001104 A1 | 1/2008 | Voigt | |
| 2008/0183842 A1 | 7/2008 | Raji et al. | |
| 2008/0149180 A1 | 8/2008 | Parris | |
| 2008/0295895 A1 | 12/2008 | Vincent | |
| 2009/0090663 A1 | 4/2009 | Hirata et al. | |
| 2009/0096586 A1 | 4/2009 | Tubb | |
| 2009/0215110 A1 | 8/2009 | Gibson et al. | |
| 2010/0207017 A1 | 8/2009 | Erickson | |
| 2009/0303055 A1 | 12/2009 | Anderson et al. | |
| 2010/0082744 A1 | 4/2010 | Raji et al. | |
| 2011/0035063 A1 | 2/2011 | Palayur | |
| 2012/0030460 A1 | 2/2012 | Chang | |
| 2012/0166233 A1* | 6/2012 | Wengrovitz | H04Q 9/00 705/7.11 |
| 2013/0176141 A1* | 7/2013 | France | G08C 17/02 340/870.02 |
| 2014/0082351 A1 | 3/2014 | Chang | |
| 2014/0338467 A1* | 11/2014 | Karnad | G01F 15/0755 73/861.27 |
| 2016/0163177 A1* | 6/2016 | Klicpera | G08B 21/18 137/59 |
| 2017/0083987 A1* | 3/2017 | Colby | G06Q 30/0283 |
| 2017/0184417 A1* | 6/2017 | Pedreiro | G01D 4/002 |

* cited by examiner

Water Use

Average Time: [10 ▼] minutes

Average Water Use: [25 ▼] gallons / minute

Average Cost: $ [2.00 ▼] / 1000 gallons

Water Heater Use          FIG. 10

Energy Type: [Natural Gas ▼]

State: [California ▼]

Cost: $ [1.789 ▼] per therm

Efficiency: [.927 ▼]

Water Temp: [55 ▼] °F

Temperature:
[Hot ▼]
[115] °F

Water Use (gallons)

|  | Day | Week | Month | Year | Five Year |
|---|---|---|---|---|---|
| Water | 25 | 175 | 750 | 9125 | 45625 |
| Energy | 0.194 | 1.359 | 5.824 | 70.858 | 354.290 |

Water Cost

|  | Day | Week | Month | Year | Five Year |
|---|---|---|---|---|---|
| Water | $0.05 | $0.35 | $1.50 | $18.25 | $91.25 |
| Energy | $0.23 | $1.60 | $6.87 | $83.54 | $417.71 |
| Total | $0.28 | $1.95 | $8.37 | $101.79 | $508.96 |

WATER METER AND LEAK DETECTION SYSTEM HAVING COMMUNICATION WITH A INTELLIGENT CENTRAL HUB LISTENING AND SPEAKING APPARATUS, WIRELESS THERMOSTAT AND/OR HOME AUTOMATION SYSTEM

RELATED APPLICATIONS

This application claims the benefit of U.S. Provisional Application No. 62/639,935 filed on Mar. 7, 2018 and U.S. Provisional Application No. 62/795,529 filed on Jan. 22, 2019.

FIELD OF THE INVENTION

This apparatus and the method of use relates monitoring and controlling water supply piping, more particularly, to using Audio or Verbal Annunciations on a central hub apparatus or home automation system to monitor and control water supply piping for a home, corporation or other building structure.

BACKGROUND OF THE INVENTION

Water conservation is becoming a major issue for many cities and an apparatus for monitoring and controlling water usage at a specific residential or corporate site could be useful in supporting water conservation.

[3.1] The Applicant previously invented and patented a shower controller having a display means, a flow rate sensor, and a control valve. This U.S. Pat. No. 9,266,136 titled "Apparatus for Displaying, Monitoring and/or Controlling Shower, Bath or Sink Faucet Water Parameters with an Audio or Verbal Annunciations or Control Means" that issued as U.S. Pat. No. 9,266,136, disclosed and claimed utilizing verbal and audio voice commands or signals to directly control a shower, faucet, bath or sink water flow and temperature. Since the market introduction of audio central hubs with intelligent listening microphone (transducer that coverts sound into an corresponding electrical signal) and speaker (that is a device that converts an electrical digital or analog audio signal into a corresponding sound) capability in a single apparatus, the Applicant is disclosing and claiming using this technology to control, or receive information from, a water meter and leak detection system (in this patent application). It is also anticipated by the Applicant that audio central hubs with intelligent listening and speaker capability could be used to control, and receive information, from a shower controller system.

Furthermore, there is a need for advance water meter and leak detection system, for home and commercial use the can incorporated this technology into these devices using wireless technology.

Furthermore, there is a need for displaying, monitoring and/or controlling water parameters using audio or verbal annunciations or commands.

SUMMARY OF THE INVENTION

The present invention comprises a water meter and leak detection system and leak detection system with a collection node or collection node/communication hub attached to a water supply within a residential or commercial building with wireless or wire capability to communicate with one or more remote communication hubs, router, gateway, network bridge or similar networking device or other wireless equipment that provide internet access or through a private or corporate owned network system. In addition, the present invention could be used with non-commercial water sources such as private wells and other non-commercial water sources. The water meter and leak detection system collection node can have a display means for indicating functional features. In a first embodiment, a first wireless means is incorporated in the collection node which includes a low power long-range type technology (such as LoRa, Sigfox, WiFi3, Ultra Narrow Band, WiMAX marketed by several manufactures or 6LoWPAN marketed by Texas Instruments) that transfers water use and water communicates with the low power long-range technology in the remote communication hub. The remote communication hub has a second wireless means which includes a wireless low power long range technology to receive water use data and information for first wireless means of the collection node wireless low power long-range type frequency technology. The communication hub either has additional at least one of a Bluetooth, Bluetooth Low Energy, Wi-Fi, WiFi3, Zigbee, Z-Wave wireless technology to communicate with router, gateway, network bridge or similar networking device or can be hard wired to the router, gateway, network bridge or similar networking device. In another embodiment, the collection node has at least one of a Bluetooth, Bluetooth Low Energy, Wi-Fi, WiFi3, Zigbee, Z-Wave, LoRa, Sigfox, Ultra Narrow Band (UNB), WiMAX, 6LoWPAN wireless technology radios are centralized at the water meter and leak detection system and leak detection system and using advanced wireless technology connected directly to router, gateway, network bridge or similar networking device to the internet. A cell phone or smart phone or other remote display and/or recording apparatus is available for viewing water parameter data by the commercial owner, occupier or home/apartment/condominium resident. The water meter and and leak detection system collection node that includes a CPU or microprocessor/microcontroller, water flow sensor, wireless low power long-range type wireless communication means and power source, an antenna and optionally includes a power generation module, an optimal pressure sensor for detecting small leak conditions, an optimal temperature sensor, and one or more optimal water quality sensors. The communication hub includes one or more CPU or microprocessors, a wireless frequency technology radio an optional Wi-Fi type wireless radio (or hard wired), and with a power source and an antenna. The water meter and leak detection system collection node and/or communication node can communicate with audio central hub having intelligent listening and speaker capabilities, wireless thermostats, and home automation and control technology.

Zigbee or other telephone lines via satellite, microwave technology, the internet, cell tower, telephone lines, and the like.

Figure 2:
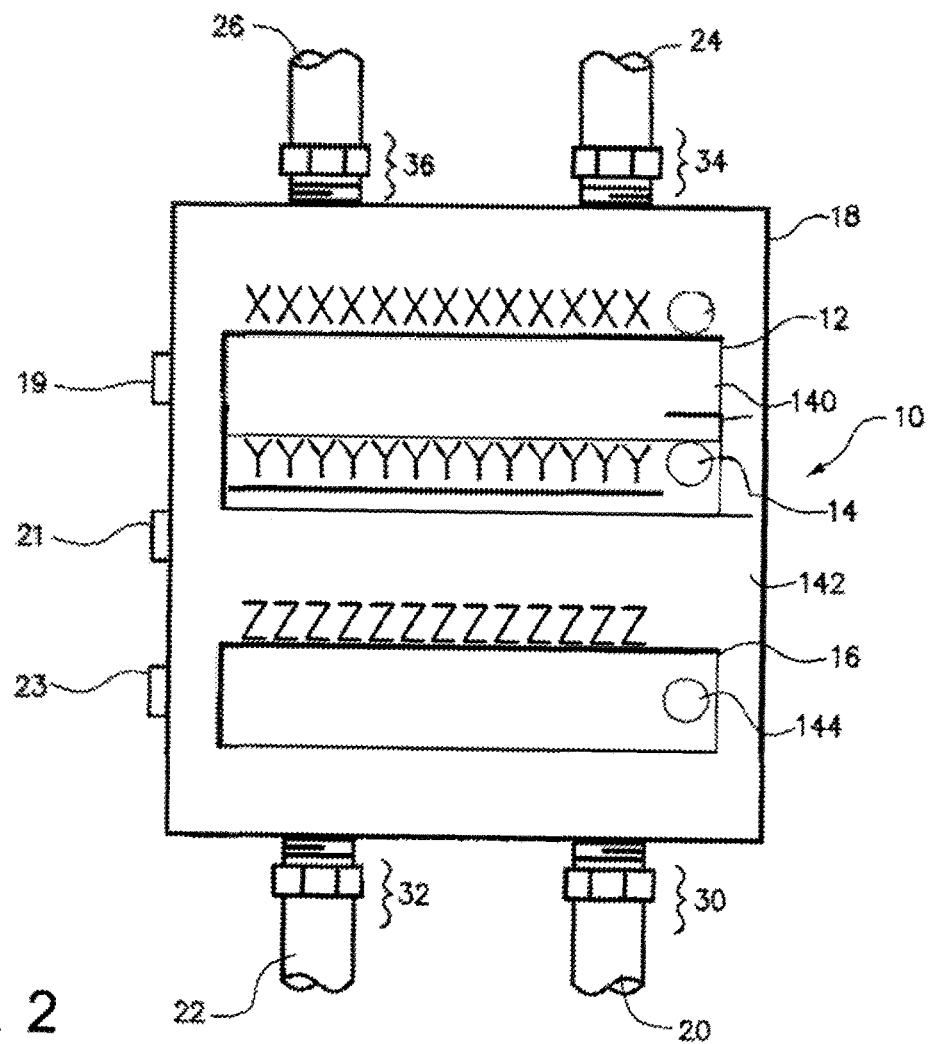

FIG. 2 is a perspective view of an optional display apparatus base showing input hot and cold-water supplies lines and output hot and cold-water supply lines with a display means having one or more display screens and a plurality of hardware and/or software buttons.

Figure 3:
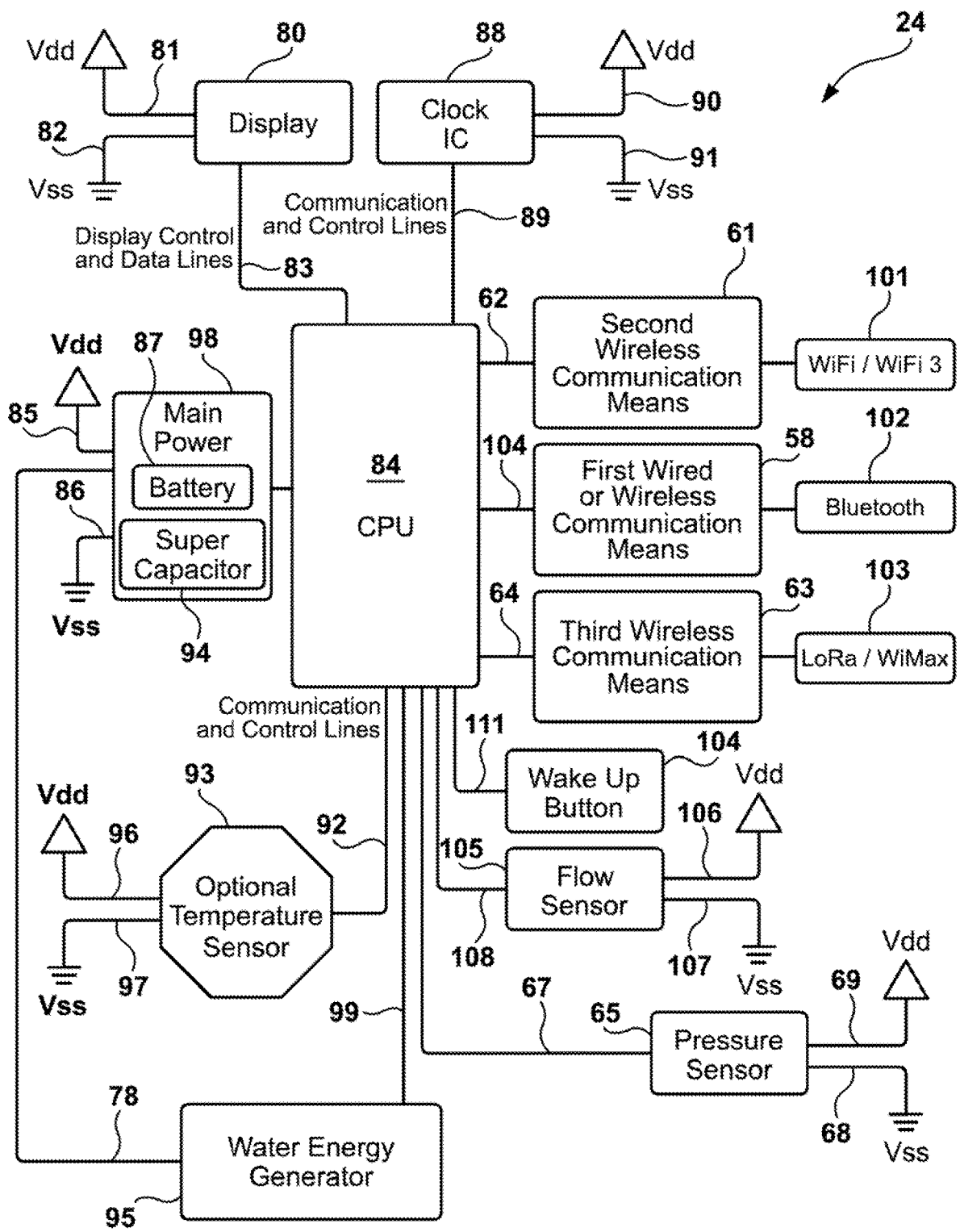

FIG. 3 is an electrical schematic showing the main power, CPU or microprocessor, the analog or digital optional display means, the clock circuit, the temperature sensor, a flow sensor and/or water quality sensor(s), and a first, second and third wireless communication means.

Figure 4:
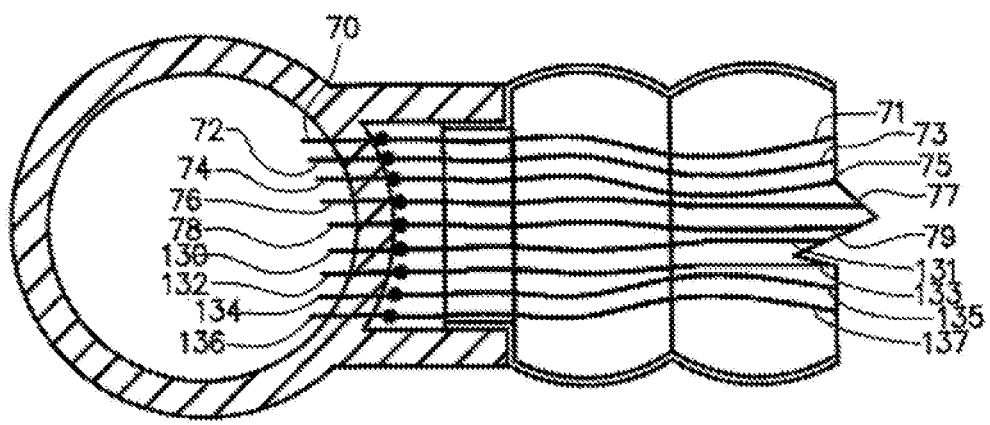

FIG. 4 is a cross-section perspective view showing a plurality of water flow and water quality parameter sensors located in relative positions within the supply line lumen and the connecting wires.

Figure 5:
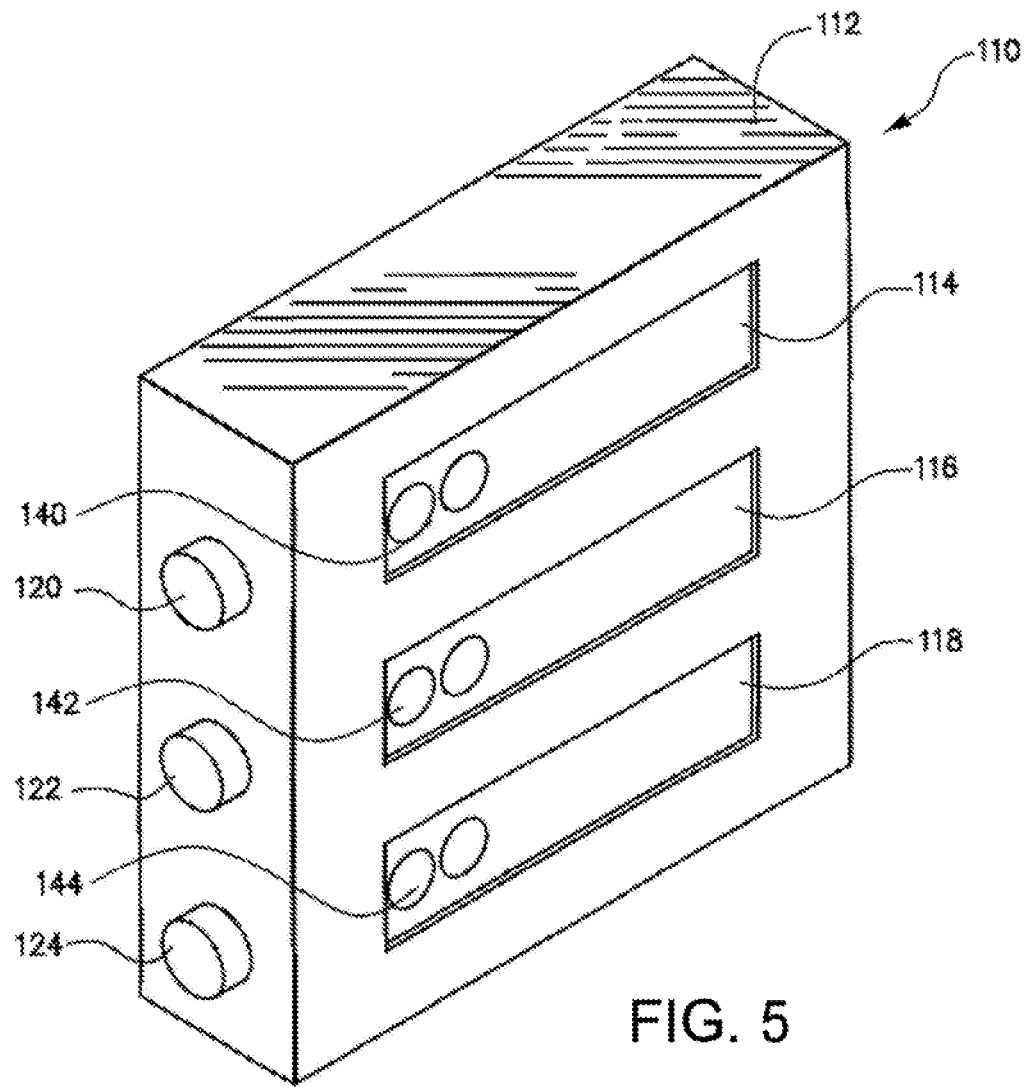

FIG. 5 is perspective view of a remote custom monitoring apparatus that communicates with the intelligent water meter and leak detection system.

Figure 6:
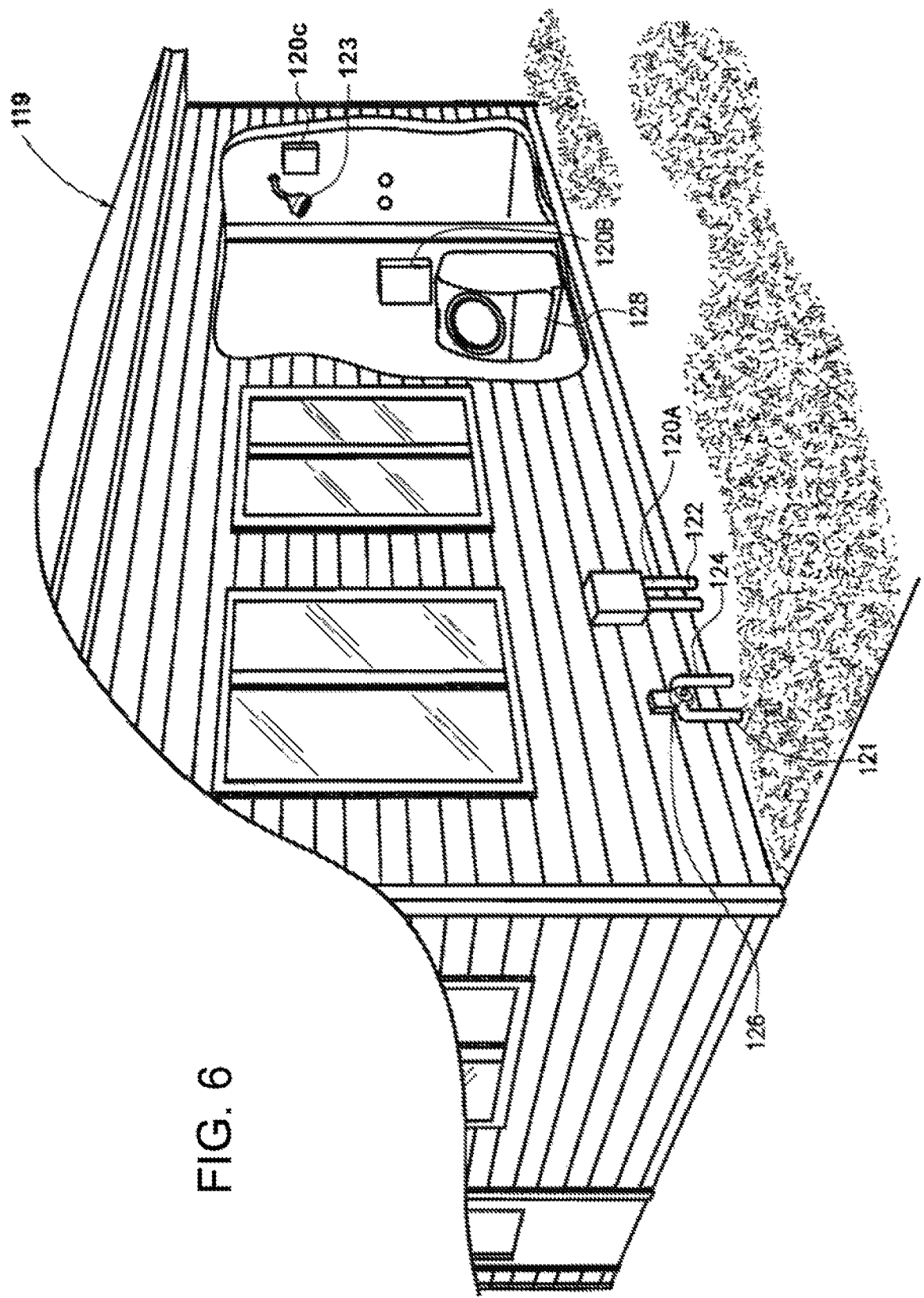

FIG. 6 is a perspective view of a smart water meter and leak detection system communicating with smart wireless device throughout a home residence.

Figure 7:
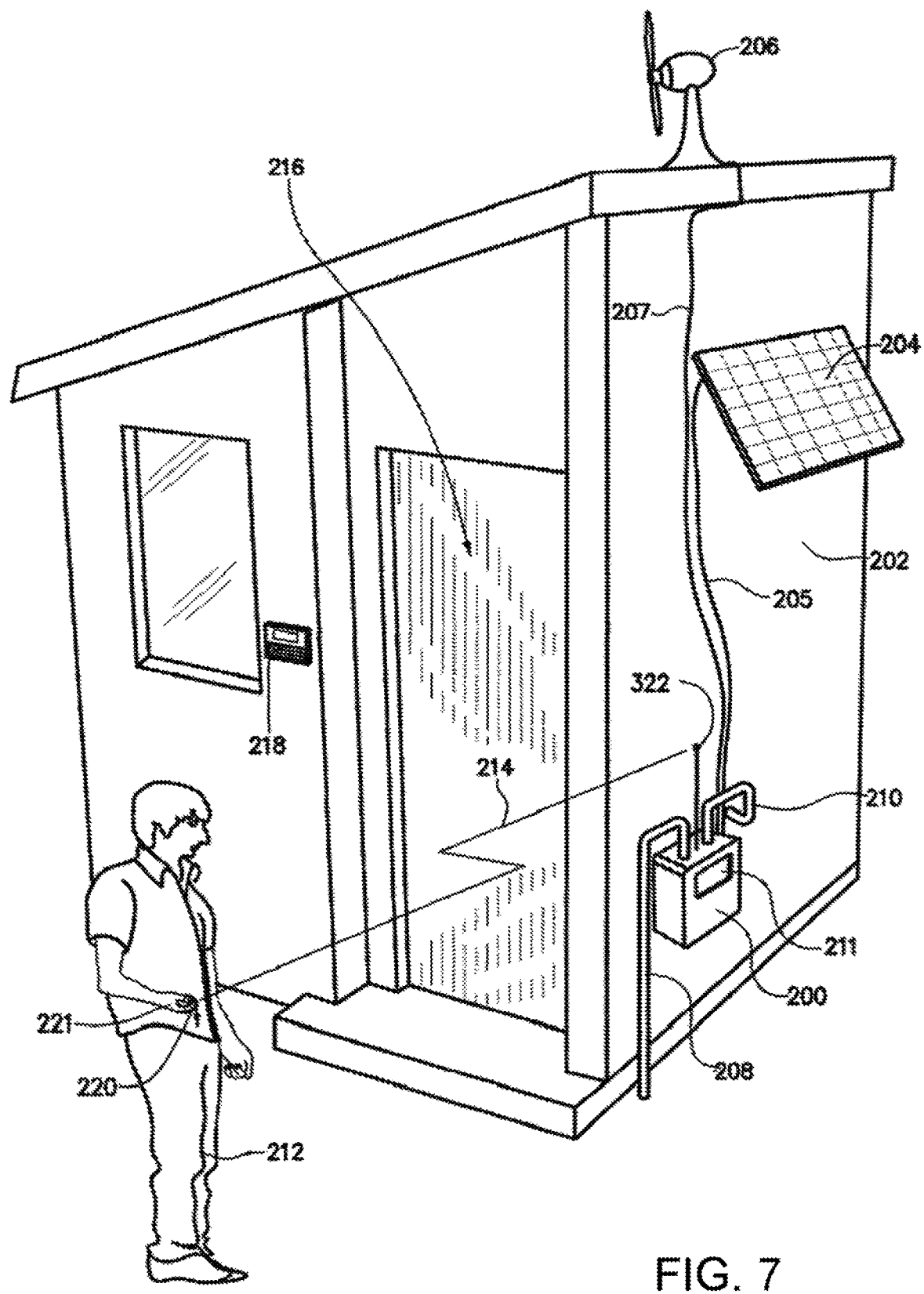

FIG. 7 is an illustration of the water meter and leak detection system attached to a residential building with wind and solar energy generation and a person having a cell or smart phone, computer, or similar apparatus communicating with the water meter and leak detection system for obtaining water parameter data or controlling a water control valve.

Figure 8:
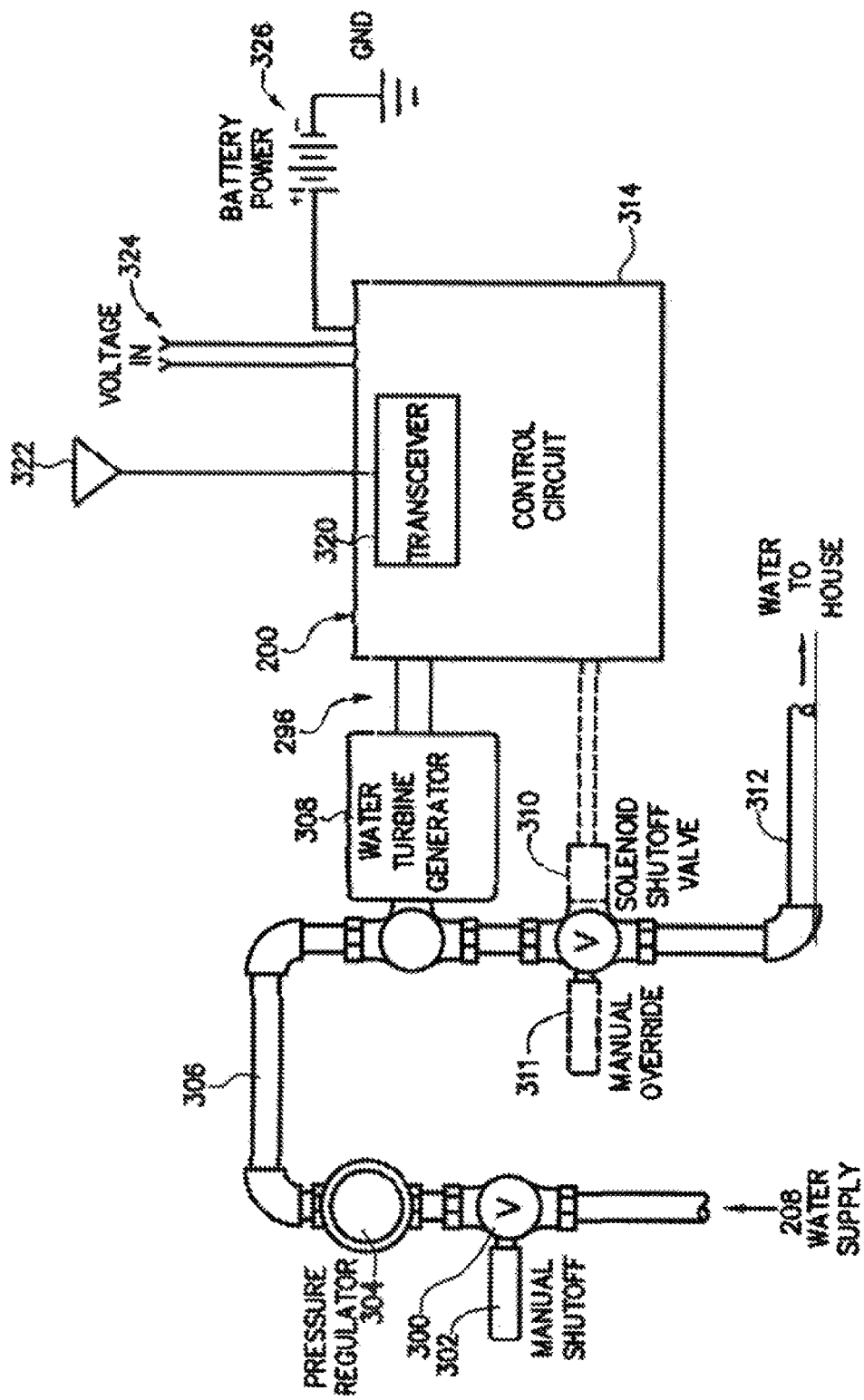

FIG. 8 is a more detailed illustration of the water meter and leak detection system collection node with the control circuit, a wireless transceiver, power supply, a water shut-off/on mechanism with a manual control, and water supply plumbing with optional water turbine energy generator that connected in series to the water supply line.

Figure 9:
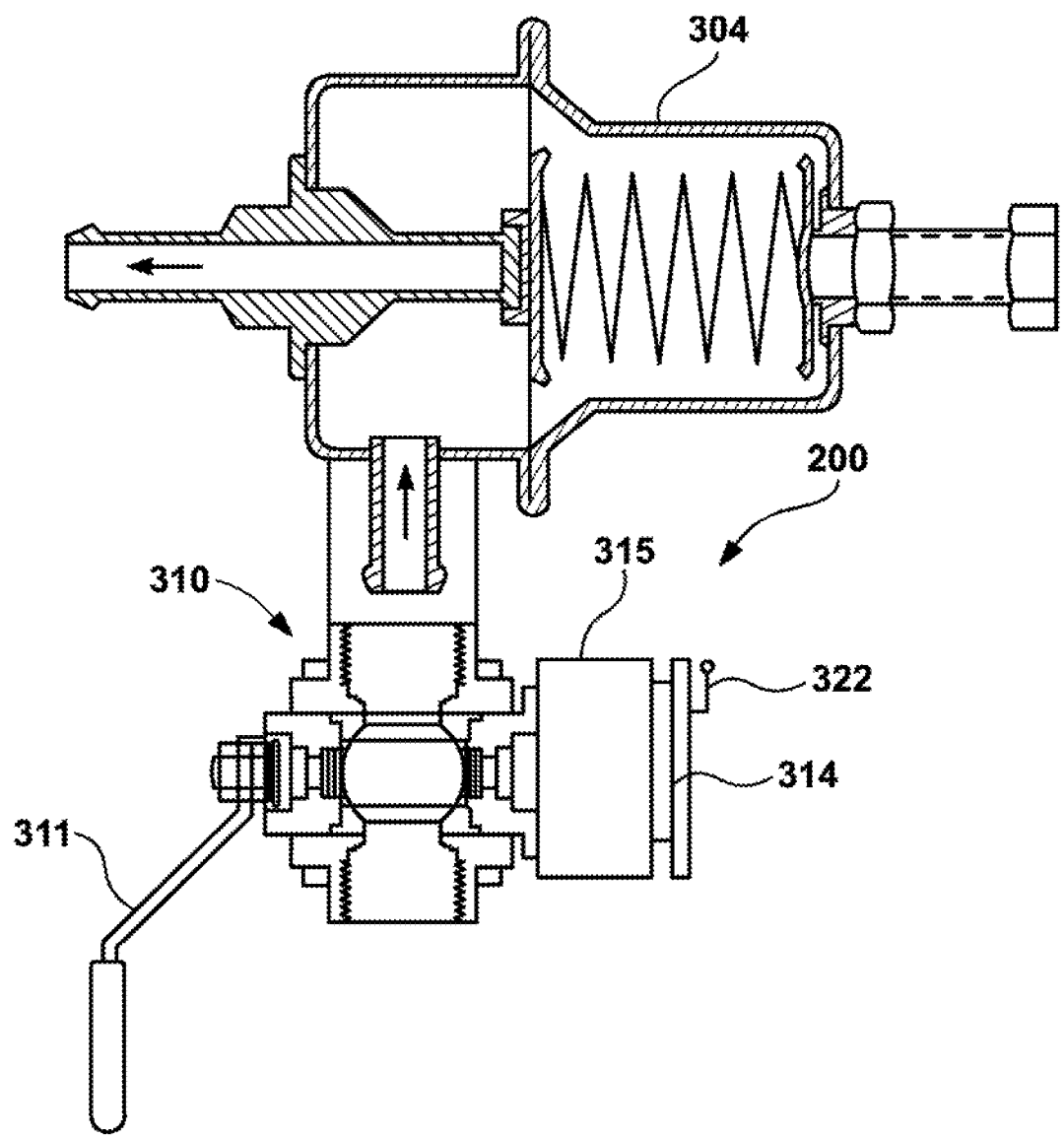

FIG. 9 is another embodiment of the present invention with a detailed illustration of the water shut-off/on mechanism combined with an independent pressure reduction valve and functioning as a combined system consisting of a water meter and leak detection system collection node with one or more water flow sensors having a water shutoff/on mechanism and pressure reduction valve.

FIG. 10 is an illustration of an "APP" or programmed application that provides water use data in various example formats that is transferred from the water meter and leak detection system collection node or with optional communication hub or receiving station to a remote display/recording apparatus, or to a remote computer/server that allows access to a registered user of a cell or smart phone, computer, or similar electronic apparatus.

Figure 11:
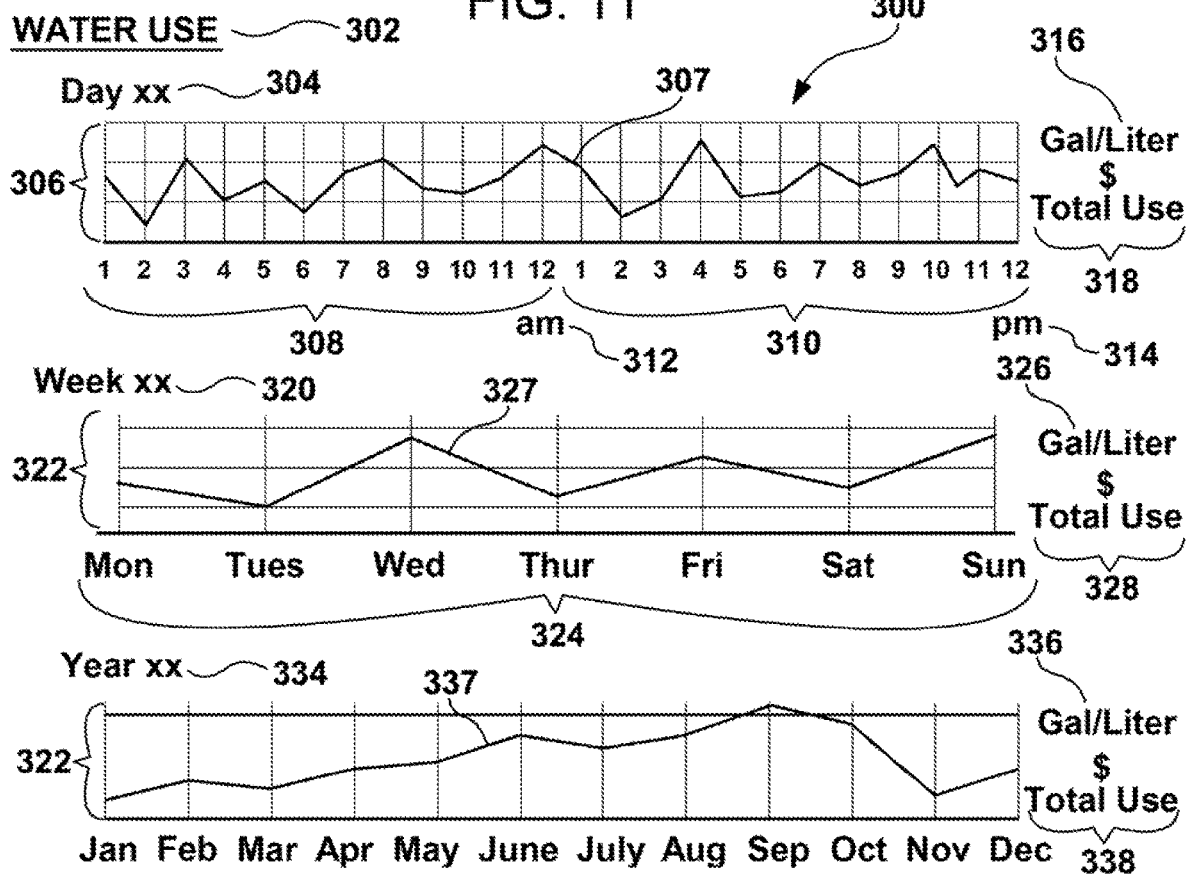

FIG. 11 is an illustration of another "APP" or programmed application, or another page of an "APP" or programmed application the displays water use data in another format that is transferred from the water meter and leak detection system collection node or with optional communication hub or receiving station to a remote display/recording apparatus, or to a remote computer/server that allows access to a registered user of a cell or smart phone, computer, or similar electronic apparatus.

Figure 12:
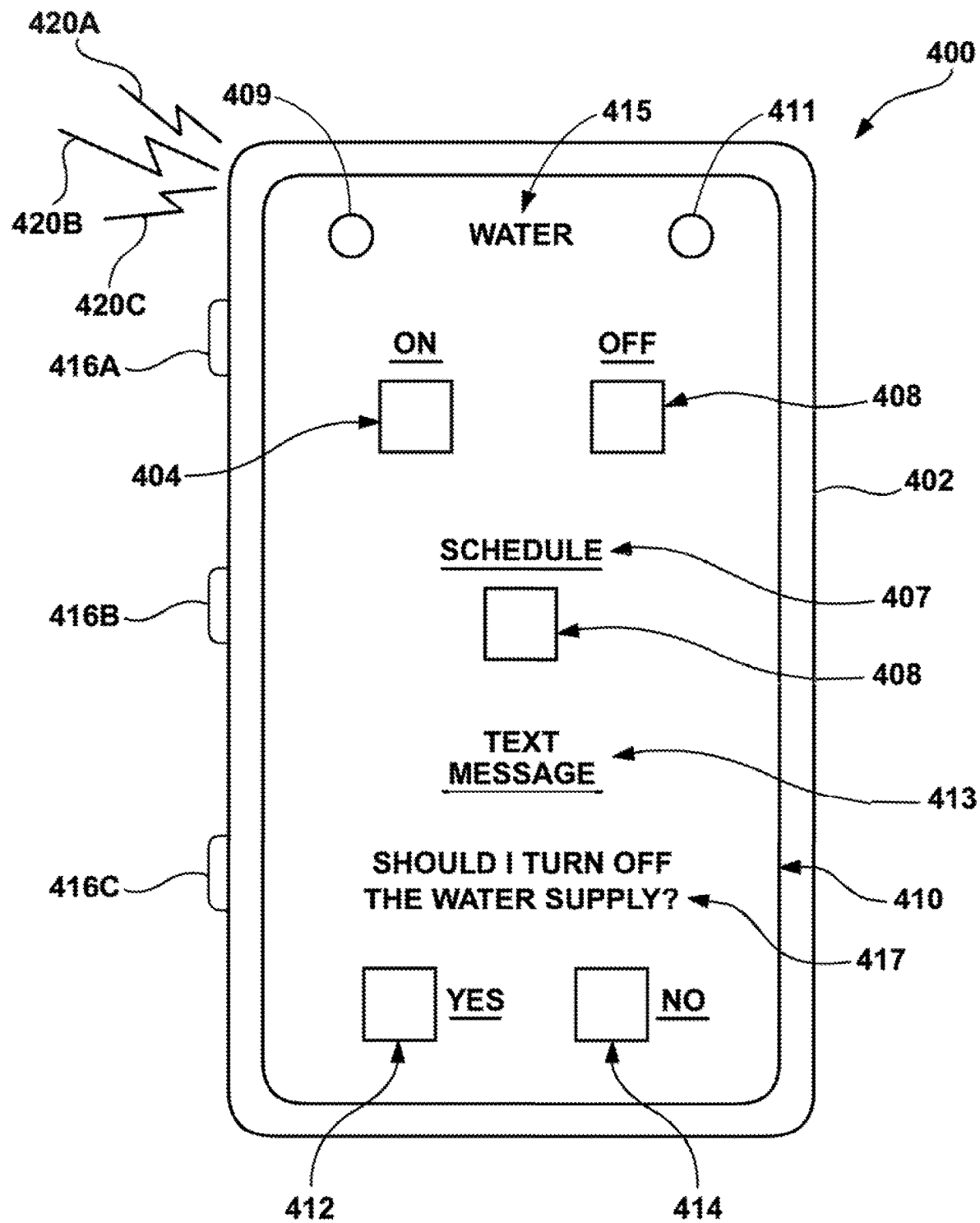

FIG. 12 is an enlarged illustration of another typical cell or smart phone, computer or similar electronic apparatus having an "APP" or programmed application, or another page of an "APP" or programmed application to display the soft buttons or control activator to turn on/or the water system, program a schedule to control the water shut off/on mechanism, or receive a text message.

Figure 13:
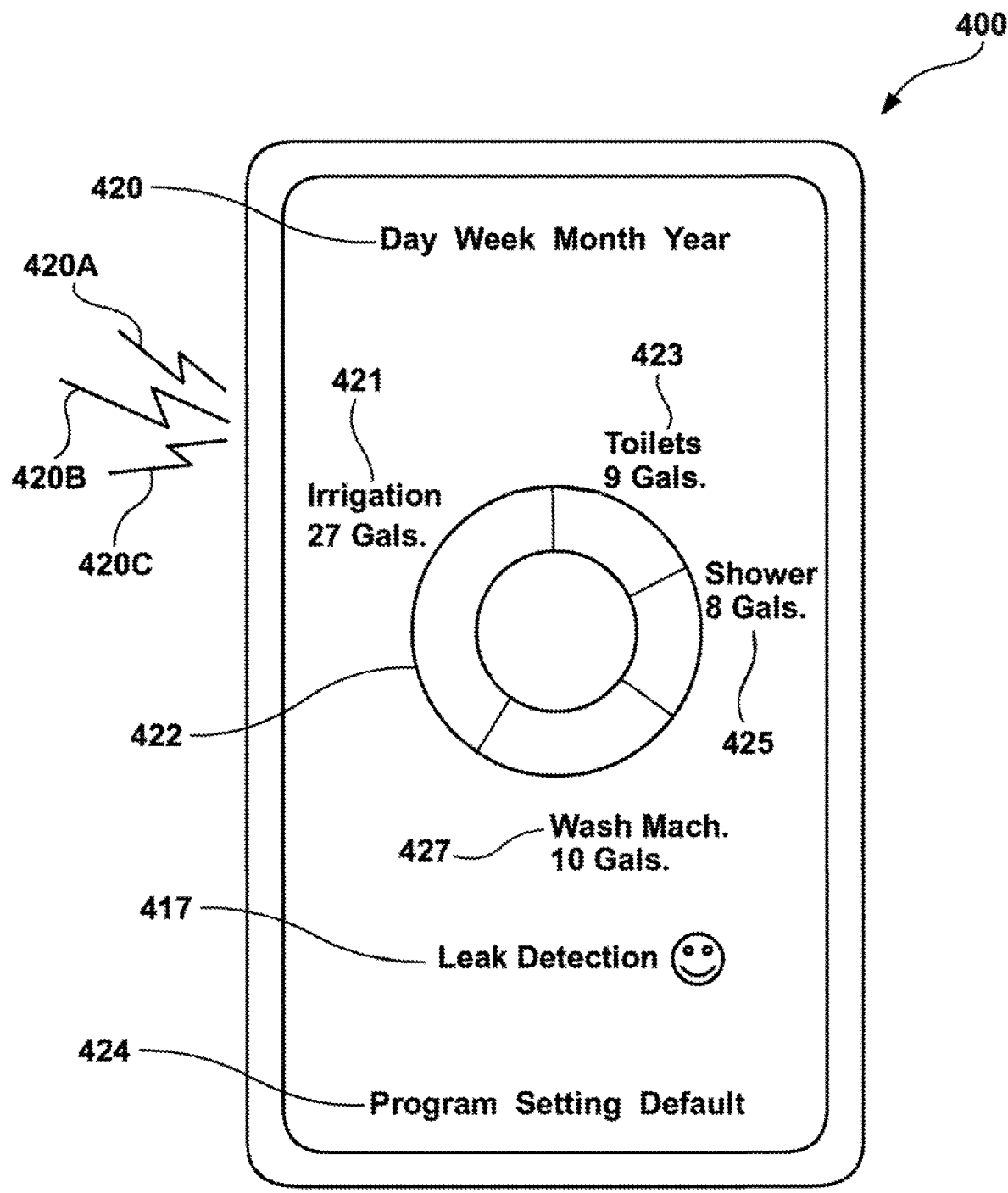

FIG. 13 is an illustration of a typical cell or smart phone, computer or similar electronic apparatus having another "APP" or programmed application, or another page of an "APP" or programmed application to display the soft buttons to determine the period for displaying, graphical of water use devices, leak detection graphical item, and programming and settings features.

Figure 14:
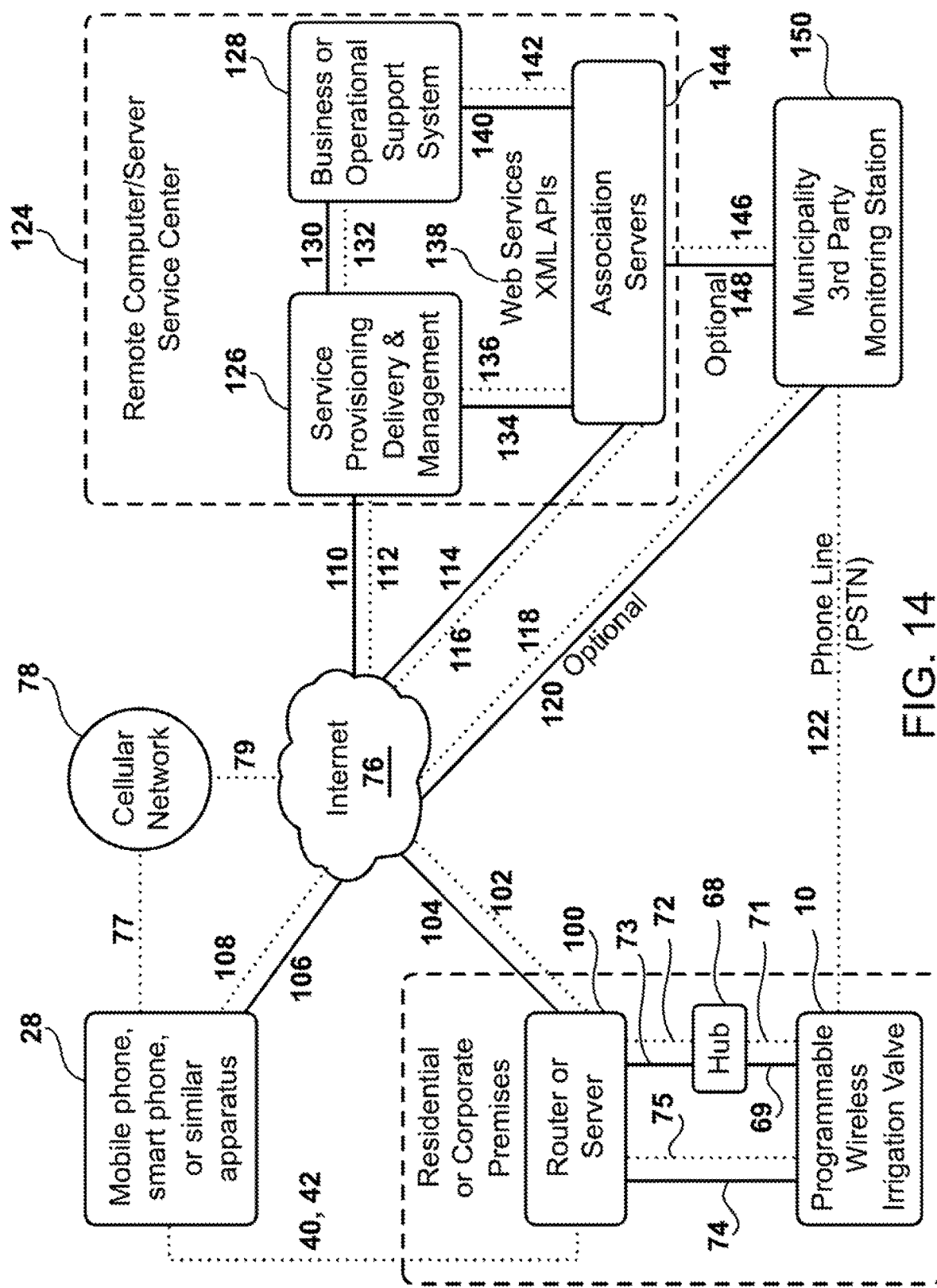

FIG. 14 is block diagram of the more integrated system showing the software, hardware and applications of the home or corporate premises communicating with the water meter and leak detection system and communicating with the internet and remote computer services ("the Cloud").

Figure 15:
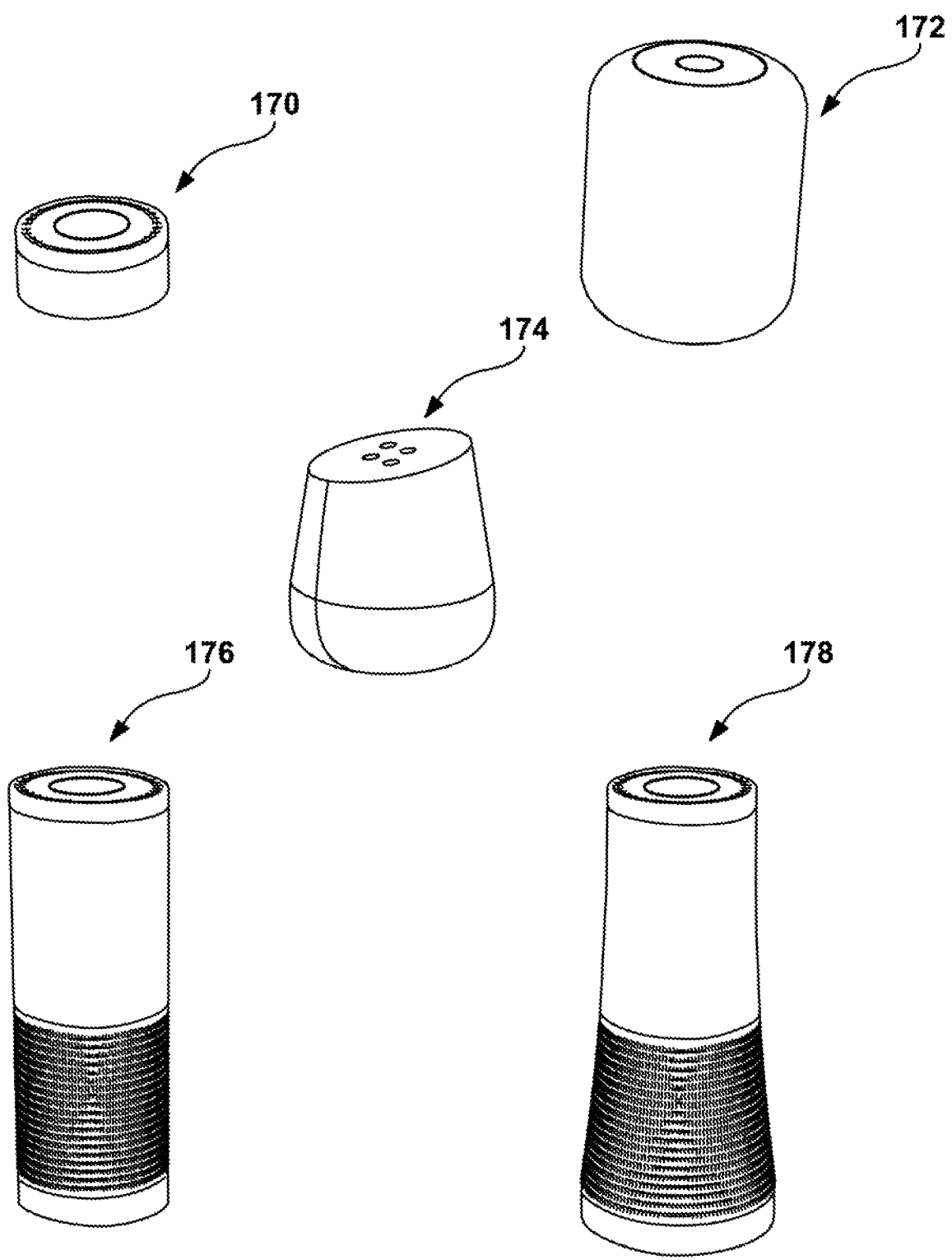

FIG. 15 is a perspective view of a several examples of a central audio hub having intelligent listening and speaker capabilities that can be used to communicate with the present invention water meter and leak detection system for respond to audio commands.

Corresponding reference characters indicate corresponding parts throughout the several views. The exemplifications set out herein illustrate exemplary embodiments of the invention, and such exemplifications are not to be construed as limiting the scope of the invention in any manner.

DESCRIPTION OF THE PREFERRED EMBODIMENTS

As defined wherein, the term "water parameters" refers to various situations or conditions, such as, but not limited to, temperature, water pressure, water flow rate, water flow time, and the capability of turning on and off a water supply.

The term intelligent audio central hub listening and speaker device refers to the non-mobile Amazon Echo®, Google Home®, Apple HomePod®, Harmon Kardon Invoke® and other virtual assistant devices that perform as a line of smart speakers developed which enable user to request information or speak voice commands to interact with device companies' remote cloud servers and computers that utilized software learning and artificial intelligence to perform as a virtual assistant. The non-mobile audio central hub listening and speaker device generally is located within a residence, corporate or building environment and connects to a wireless router located in the residence or corporate environment. The audio central hub listening and speaker device can periodically be moved to another location within the residence, corporate or building environment.

Water event use or water event use basis is defined as monitoring and sensing the initiation of water flow until the water flow is stopped, whereby the water flow rate, the duration of water flow, and the total water volume can be calculated and recorded. The water event use will inherently save wireless transmission energy by causing the CPU to go into a sleep mode between each water event use and allowing a superior analysis of water signatures and patterns for reliable discernment of leak and leak locations.

Cellular format technology refers to all current and future variants, revisions and generations [e.g. third generation (3G), fourth generation (4G) and 3GPP (and enhancement revisions), fifth generation (5G), 3GPP cellular technology, all future generations of Global System for Mobile Communication (GSM), General Packet Radio Service (GPSR), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA, Integrated Digital Enhance Network (iDEN), HSPA+, WiMAX, LTE, Flash-OFDM, HIPERMAN, WiFi, IBurst, UMTS, W-CDMA, HSPDA+HSUPA, UMTS-TDD, other formats for utilizing cell or smart phone technology, telephony antenna distributions, and/or any combinations thereof] and includes the use of satellite, microwave technology, the internet, cell tower, telephony, and/or public switched telephone network lines. Cellular (3GPP) refers to the original release 8 and the associated enhancements (9-14). The original release 8 included high peak data rates, up to 300 Mbps in downlink and 75 Mbps in uplink when using a 20 MHz bandwidth that includes high spectral efficiency and flexible bandwidths (1.4 MHz, 3 MHz, 5 MHz, 10 MHz, 15 MHz and 20 MHz), 5 millisecond latency for IP packets in ideal radio conditions, simplified Architecture, orthogonal frequency-division multiple access (OFDMA) in downlink and Single-carrier frequency-division multiple access scheme (SC-FDMA) in uplink, all IP network, and using the multiple in and multiple out (MIMO) multiple antenna pattern. Further enhancement of the 3GPP technology consists of the start of 5G cellular technology). In addition to the continued Long-Term Evolution (LTE) cellular evolution, a new and updated radio access technology will be standardized, and these two technologies will form 5G radio access standard. Benefits of the 5G standard will include low latency communication, spectrum flexibility, machine type communication, multi-antenna and multi-site transmission techniques, and ultra-lean design. The merging of LTE-M and 5G forms the LTE Cat-M1 and/or Long-Term Evolution (4G) Cat-M1. The LTE Cat-M1 and LTE (4G) Cat-M1 technology is designed for Internet of Things (IoT) devices to connect directly to a 4G or 5G network, without the typical node/computer network that passes traffic from a local network to other networks or the Internet router (a gateway) and further while running on battery power. Devices can connect to 4G and 5G networks with microchips that are less expensive to fabricate because these microchips are half-duplex and have a narrower bandwidth. Such designed devices can enter a "deep sleep" mode called Power Savings Mode (PSM) and only wake up periodically while connected. Because the maximum data rate of LTE-Cat-M1 and 5G devices is only about 100 kbits/s, these cellular protocols do not burden the 4G network. Cellular version 5G uses several cell sites that divide territory in various sections. Then version 5G send encoded data and information through radio waves to each cell site that is connected to a mainstay support network that uses wired and wireless technology. The version 5G encodes using orthogonal frequency-division multiplexing (OFDM) format that is similar to version 4G but has a lower latency and with the numerous cell sites has greater flexibility. In comparison with 4G, version 5G managing more and reduce cell sites that can adjust and modify the size and shape of the cell sites. This requires version 5G to be more intelligent and utilizes advance antenna technology to provide wider bandwidths.

Cell or smart phones, computers, or similar apparatuses includes all cellular phones and mobile electronic communication devices using access and format methods (with cellular equipment, public switched telephone network lines, satellite, and/or mesh technology); personal digital assistants (PDAs); tablets (refers to all current and variants, revisions, and generations of the APPLE®, SAMSUNG®, HP®, ACER®, MICROSOFT®, NOOK®, GOOGLE®, SONY®, KINDLE® and other tablets manufactured by these and other manufacturers); APPLE IPOD TOUCH®; smart or internet capable televisions; wireless timepieces or wireless watches; other electronic apparatuses with Wi-Fi and wireless capability; remote computers and controllers having internet, cellular technology, Wi-Fi, ZigBee, Bluetooth, Bluetooth low energy (BLE), and any combinations thereof.

LoRa, comprises a low-power wide area and long-range network protocol based on Semtech or HopeRF LoRa technology for IoT devices, and LoRa networks and machine-to-machine (M2M) applications. LoRa format is usually defined as a frequency modulated (FM) chirp technology. LoRa uses a stable chirp spread spectrum (CSS) technology developed by the company Semtech. Because the chirp utilizes an entire allocated broadband of the spectrum, chirp spread spectrum is also resistant to multi-path fading even when operating at very low power. Also, chirp spread spectrum is resistance to Doppler effect, which is typical in other radio frequency applications. LoRa's secure bi-directional communications utilize an asynchronous protocol that is designed for long wireless range with extended battery life. Existing gateways are connected to the network server via standard internet protocol connections while end-devices use single-hop wireless communication to a LoRa network of gateway known as LoRaWan. LoRa communication is generally bi-directional or a duplex format, but also at the same time supports multicast operations for enabling software upgrades or mass distribution messages to reduce the on-air communication time. Communication between a sophisticated water meter with at least one of a water, pressure, temperature and acoustic sensor is spread out on different frequency channels and data rates. The selection of the data rate is a trade-off between communication range (power) and message duration. To maximize both battery life LoRa can include specialized software that can manage the data rate and radio frequency output for each water meter by mans of an adaptive data rate (ADR) scheme. Thus, the LoRa technology offers high penetration, low bandwidth, low energy consumption, long range, and secure data that is gaining significant penetration into the IoT networks.

The LoRa wireless system makes use of the unlicensed frequencies below 1 GHz that are available worldwide:
  868 MHz for Europe
  915 MHz for North America
  433 MHz band for Asia Using lower frequencies than those of the 2.4 or 5.8 GHz ISM bands enables much better coverage to be achieved especially when the nodes are within buildings enabling superior penetration of large buildings and penetrate solid walls.

Lora's main and upcoming competitor is Sigfox which employs the differential binary phase-shift keying (DEPSK) and the Gaussian frequency shift keying (GFSK) that enables communication using ISM radio bands 868 MHz in Europe and 902 MHz in the United States. Sigfox utilizes a wide-reaching signal that passes freely through solid objects and is considered to be a "Low-power Wide-area network" or LPWAN. The Sigfox signal can also be used to easily cover large areas and to reach underground objects. Presently Sigfox technology is being installed and utilized throughout the world as a wireless platform for IoT communications.

Ultra Narrow Band (UNB) refers to technology that transmits over a very narrow spectra (for example less less than 1 KHz) to achieve ultra-long range for data communication between a sensor collection node transmitter and a communication between a sensor collection node transmitter and a communication receiving hub. By transmitting in a UNB channel, little power is required to transmit data over a considerable distance. UNB systems are frequently used in one-way, half duplex e.g. from collection node sensor(s) to an optional communication hub but can mimic two-way full duplex communication when the receiver/sensor is sleeping most of the time and must open once a few times each hour to listen for signal commands or massages.

With traditional Wi-Fi, most networks were designed on the ranges delivered by 802.11 standard operating frequencies 2.4 and 5.8 GHz and protocol for distance and performance. Newer Wi-Fi technology being developed is known as WiFi3. In the foreseen near future, companies like Edgewater Wireless will develop and market Wi-Fi3 powered technology that will deliver reliable, high-capacity indoor and outdoor Wi-Fi wireless communication and protocols for high-density environments. The high channel density will enable multiple channels of a single chip meaning aggregate output on a single Wi-Fi3 enabled device will outperform traditional, single channel Wi-Fi technology. Thus, the fewer access points will deliver higher quality of service that can considerably lower the cost of deployment of IoT devices. Remote and rural infrastructure installations are easily achievable due to the extended network coverage and performance capabilities of Wi-Fi3.

WiMAX refers to interoperable implementations of the IEEE 802.16 family of wireless-networks standards ratified by the WiMAX Forum. Wireless WiMAX suffers like most other wireless technology that the further away from the source the slower their connection becomes. The WiMAX Forum has proposed an architecture that defines how a WiMAX network can be connected with an IP based network. WiMAX Forum published three licensed spectrum profiles: 2.3 GHz, 2.5 GHz and 3.5 GHz, to establish standardization.

6LoWPAN is an acronym that combines the new Internet Protocol (IPv6) with a sub 1 GHz frequency and low power wireless personal area networks. The 6LoWPAN supports hundreds of hops for developing wireless mesh networks with high self-healing (node failure) and self-maintenance of mesh routes. The 6LoWPAN architecture consists of a local network with routers/servers which utilizes a one or more edge router(s) to connect to the access network. The one or more edge router(s), communicating with the internal server, then provides the IoT sensor and applications to access to the internet. IPv6 is also in use on the smart grid network enabling smart meters (water meter and leak detection systems) and other devices to build a micro mesh network before sending the data back to the main remote servers with database for monitoring and billing operations.

Bluetooth Low Energy (BLE) refers to a newer version of standard Bluetooth. Standard Bluetooth was originally designed for continuous streaming of data applications. Both standard Bluetooth and BLE low energy operate in the 2.4 GHz ISM band. However, the BLE remains in a sleep mode constantly except for when a connection is initiated. The actual connection times are on a few milliseconds, unlike standard Bluetooth's continuous streaming. BLE short time connection allows for higher data transfer rates of approximately 1 Mb/s.

Wired communication can be standard wired technology, such as X10, UPB and the HART Communication Protocol (Highway Addressable Remote Transducer). X10 is a protocol for communication among electronic devices primarily used in the home automation industry. It primarily uses the power line wiring for signaling and control, where the signals involve brief radio frequency bursts representing digital information that transmits along the previously installed home electrical wiring. Universal Powerline Bus is a proprietary software protocol for power line communications between devices and again used for primarily in the home automation industry. Household electrical wiring is used to send digital data between UPS devices using pulse position modulation. The newer UPS protocol is more reliable that the older X10 technology, which allowed the UPB protocol to significantly penetrate the wired market. Communication can be peer to peer with no central controller necessary. The HART Communication Protocol (Highway Addressable Remote Transducer) is a hybrid analog digital industrial automation open protocol. Its most notable advantage is that it can communicate over legacy 4-20 mA analog instrumentation current loops, sharing the pair of wires used by the analog only bee systems. HART is widely used in process and instrumentation systems ranging from small automation applications through highly sophisticated industrial applications. Due to the huge installed base of 4-20 mA systems throughout the world, the HART Protocol is very popular for industrial protocols.

The terms wired (e.g. X10, UPB, HART Communication Protocol) and wireless electronic communication (e.g. Wi-Fi, Wi-Fi version 3 or WiFi3, 6LoWPAN, ZigBee, Z-wave, Bluetooth, Bluetooth low energy (BLE), WiMAX, long range low power technology such as LoRa, Ultra Narrow Band (UNB), and cellular technology 3GPP and LTE-M and 5G) correspond to the concept of "internet of things" or "IoT". The internet of things is defined herein as a network of physical objects or things that is comprised of electronic apparatuses (collect node and communication hub), programmable software, various sensor technology (flow, temperature and water quality and leak detectors), and local routers/servers and/or remote network and internet connectivity, which enable apparatuses to collect and exchange data. The internet of things allows devices to be sensed and controlled remotely across existing network infrastructure, creating opportunities for more direct integration between the physical world and computer-based systems and resulting in improved efficiency, monitoring accuracy and economic benefit. The internet of things encompasses technologies such as smart grids, smart homes, and intelligent wire and wireless electronic communications.

Several major companies are beginning to market smart central hub listening and speaker devices such as the Amazon Echo, Goggle Home and Apple's HomePod.

Amazon Echo and Echo dot is a smart central hub listening and speaker device developed by Amazon. The device currently consists of tall cylinder speaker with a seven-piece microphone array.

Google Home is a smart central hub listening and speaker device developed by Google. Google Home enables users to speak voice commands to interact with services through the Home's intelligent personal assistant called Google Assistant.

The HomePod is a smart central hub listening and speaker device by Apple Inc. The voice assistants in these speakers help differentiate them from the hundreds of Bluetooth and Wi-Fi speakers out there. The HomePod is touted by Apple to be the ultimate music authority, bringing together Apple Music and Siri to learn a user's taste in music. It's also an intelligent home assistant, capable of handling everyday tasks and controlling your smart home.

Harmon Kardon Invoke is another smart central hub listening and speaker device from Harman Kardon with Cortana by Microsoft. Invoke delivers exceptional sound, and with Cortana's intelligence you can voice control your music and smart home devices, create reminders and lists, manage schedules, get answers to questions, make and receive hands-free calls with Skype, and more.

Amazon Echo has Alexa, Google Home has Google Assistant, Apple HomePod has Siri and Harmon Kardon has Cortana. They all work in much the same way, but they don't work together. All three voice assistants use cloud computing for voice recognition and responding to queries and demands. This means each device needs to be connected to the internet to work. When you're connected, your demands are sent to Amazon, Apple, or Google remote servers, which find an answer to your question or connect with the services you want to use and send the proper response back to the device.

Home Automation is gaining market acceptance and there are advantages to the smart water meter and leak detection systems to communicate with home automation equipment. The company Nest makes thermostats and cameras that communicates with your wireless router and the internet for cell phone control.

Figure 1:
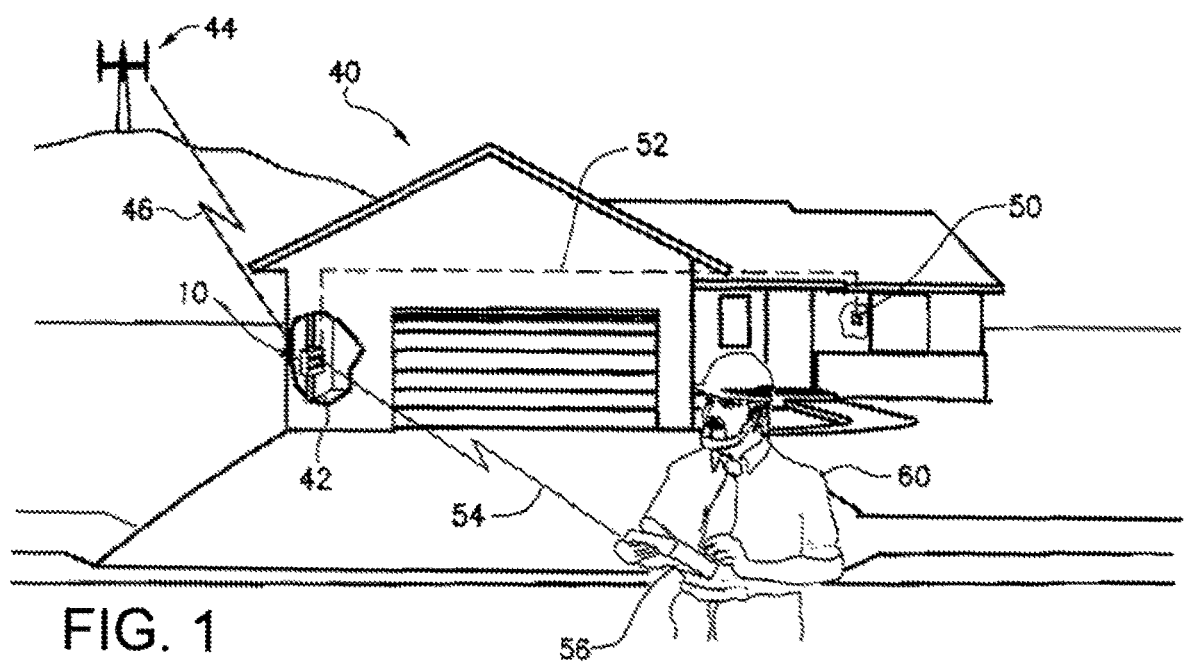
FIG. 1 is a perspective view of the embodiment comprising the water meter and leak detection system affixed to the input water supply piping for continuously monitoring of the water and leak detection within a residential or commercial building. Also shown in FIG. 1 is the wireless or wired capability of the water use monitoring and leak detection apparatus for communicating water use and leak detection information to a conveniently located remote display/recorder for the commercial operator or occupier or residential individual and an optional display/recorder for a governmental, civil, commercial or municipal operators or agencies. In addition, FIG. 1 also shows a wireless means for communicating to a homeowner or offsite central monitoring computer using cell, mobile Wi-Fi, Bluetooth/ZWave/

Referring now to the drawings and particularly to FIG. 1 is a perspective view of the present invention comprising water meter and leak detection system 10 affixed to the cold or ambient water supply piping in an appropriate location for water monitoring 42 and for continuously monitoring of the water and water energy use within a private or public, residential or commercial building 40. This can be useful for an individual or commercial operator employing water conservation methods (e.g. reduce the sprinkler frequency or duration, encourage individuals to take shorter showers, fix leaking devices). Alternately, the monitoring of indoor water use and outdoor water use could be utilized by the particular water supplying municipality or government agency to apply different rates for indoor water use and outdoor water use. In addition, since many municipal agencies include a sewer cost in a ratio of the total supply use, the difference between indoor water use and outdoor water use can reduce the total sewer cost associated with only the indoor use, thus saving the consumer costs. In certain situations, a control valve can be located at a particular location, e.g. the irrigation valve whereby by utilizing the two-way wireless capability of the water meter and leak detection system 10, 126 whereby the water supplying municipality or government agency can remotely control water use (e.g. send out a code that inhibits outdoor water use on certain days or at certain hours of the day). It is also anticipated by the Applicant that water meter and leak detection system can be used on wells and in situations where the water source is not obtained from commercial or municipal operations. The water meter and leak detection system 10, 126 can update, upload or download water and energy use on various frequencies, e.g. once per minute, once per hour, once per day, or can send information upon sensing the initiation of water use (after no water use period) e.g. water event basis.

Also shown in FIG. 1 is a first wired or wireless communication means 52, e.g. Bluetooth, Bluetooth Low Energy, Wi-Fi, WiFi3, Zigbee, Z-Wave from the water meter and leak detection system (and 126 in FIGS. 6 and 200 in FIG. 7) for communicating water use and water energy use information or data to a conveniently located first display and/or recorder apparatus 50 located in a convenient location, or a cell phone, smart phone, mobile phone, computer, Smart TV with wireless technology or similar apparatuses for the commercial operator or occupier or residential individual to observe daily, weekly, monthly or annual water use. The water meter and leak detection system x 10 (and 126 in FIGS. 6 and 200 in FIG. 7) can be programmed to communicate at time frequencies, such as per water event, or every 5 seconds, for various purposes, for example, to identify leaking conditions. The first wireless communication means 52 e.g. (Bluetooth, Bluetooth Low Energy, Wi-Fi, WiFi3, Zigbee, Wave) preferably utilizes encryption, authentic, integrity and non-repudiate techniques to provide a secure transfer of the water and energy use from the water/energy use from the water meter and leak detection system 10 (and 126 in FIGS. 6 and 200 in FIG. 7) to the first remote and/or recorder 50 which can be a custom device or a cell phone, smart phone, computer, TV or similar device or to the central audio hub having intelligent listening and speaker. The first wired or wireless communication means 52 can send data on various frequencies, e.g. once per minute, once per hour, once per day, on a water use basis, or can send information upon sensing an initiation to the first remote and/or recorder 50 or atypical cell phone, smart phones, or similar apparatus 400. Furthermore, the first wired or wireless communication means 52 can send data or information upon the sending of a request signal. The request signal can be generated by, for example, the pushing of a requesting button located on the first remote display and/or recorder 50 that transmits a request for water and energy use data to the water meter and leak detection system 10 (and 126 in FIGS. 6 and 200 in FIG. 7). The use of the request signal can minimize the use of wireless signals within the house or commercial building, conserving energy, minimizing the interference with other wireless devices, and reduce the exposure of wireless energy to individuals. Furthermore, the first wireless communication means 52 can consist of two-way transmission, commonly known as transceiver technology, such that the water meter and leak detection system 10 (and 126 in FIGS. 6 and 200 in FIG. 7) can transmit and receive electronic signals from the first display and/or recording apparatus 50 and similarly, and the first display and/or recording apparatus 50 can transmit and receive electronic signals from the monitoring display apparatus water meter and leak detection system 10 (and 126 in FIGS. 6 and 200 in FIG. 7). The first wired or wireless communication 52 can be either one-way transmission, or half duplex and/or full duplex two-way transmission.

Wireless local communication means 54 (Bluetooth, Bluetooth Low Energy, Wi-Fi, WiFi3, Zigbee, Z-Wave, LoRa, Sigfox, Ultra Narrow Band (UNB), WiMAX, 6LoWPAN and cellular) wireless technology preferred to transit, upload or download water parameter data or information via a secure wireless communication network providing information to a governmental, civil or municipal employee or individual 60 using a second remote display and/or recorder apparatus 56 (or a typical cell phone, smart phones, or similar apparatus 400) for governmental, civil, commercial or municipal operators or agencies purposes. It is anticipated that the wireless communication means 54 can communicate with cellular format technology utilizing cell towers 44. The second optional wireless communication means 54 (Bluetooth, Bluetooth Low Energy, Wi-Fi, WiFi3, Zigbee, Z-Wave, LoRa, Sigfox, Ultra Narrow Band (UNB), WiMAX, 6LoWPAN and cellular) preferably utilizes encryption, authentic, integrity and non-repudiate techniques to provide a secure transfer of the water and water energy use from the water meter and leak detection system 10 (and 126 in FIGS. 6 and 200 in FIG. 7) to the second remote display and/or recorder apparatus 56. Also, the second wireless communication means 54 should include specific identification information e.g. house or commercial building address. The second optional wireless communication means 56 can send data on various frequencies, e.g. water event basis, once per minute, once per hour, once per day, or can send information upon sensing an initiation to the second remote and/or recorder 56. The water meter with leak detection capability 10 (and 126 in FIGS. 6 and 200 in FIG. 7) can be programmed to communicate at other time frequencies, such as at a water event basis, every 5 seconds or every minute, for various purposes, for example, to identify leaking conditions. Furthermore, the second optional wireless 56 communication means can send data or information upon the sending of a request signal. The request signal can be generated by, for example, the pushing of a requesting button located on the second remote display and/or recorder 56 that transmits a request for the water meter and leak detection system (and 126 in FIGS. 6 and 200 in FIG. 7). The use of the request signal can minimize the use of wireless signals within the house or commercial building, conserving energy, minimizing the interference with other wireless devices, and reduce the exposure of wireless energy to individuals. Furthermore, the second wireless communication means 54 can consist of two-way transmission, commonly known as transceiver technology, such that the water meter and leak detection system 10 (and 126 in FIGS. 6 and 200 in FIG. 7) can transmit and receive electronic signals from the second optional display and/or recording apparatus 56 and similarly, and the second optional display and/or recording apparatus can transmit and receive electronic signals from the monitoring water meter and leak detection system 10 (and 126 in FIGS. 6 and 200 in FIG. 7) Hence, the second optional wireless communication means 46 can be either one-way transmission, or half duplex and/or full duplex two-way transmission.

In addition, it is anticipated that the sensor analog (or digital) data that is communicated either through direct wiring or through a wireless means that is then amplified by a circuit and connected to the microprocessor 84 through one of the analog-to-digital modules (if necessary). It is possible to have a local data means 20 together with a remotely located data receiver apparatus. The data transfer means 83 can be hard wired or use radio-frequency, Bluetooth, Zigbee, Wi-Fi, optical or other wireless technology for transferring the water parameter data generated by the sensors and collected by the microprocessor and sent to a wired or wireless to a display means 20 and/or a remotely positioned receiver apparatus. Display means 20 and/or a remotely positioned receiver apparatus can have the function allows an individual or entity to review that data for auditing or monitoring purposes. Examples of Bluetooth modules (using the 2.4 GHz band as Wi-Fi) that can be added to the present invention are the RN-41 Bluetooth modules available from Roving Networks in Los Gatos, Calif., the KC-41, KC 11.4, KC-5100, KC-216 or KC-225 data serial modules from KC Wireless in Tempe Ariz., and/or the BT-21 module from Amp'ed RF wireless solutions in San Jose, Calif. Examples of wireless protocols that can be utilized with the present invention include, but are not limited to, the IEEE 802.11a, IEEE 802.11b, IEEE 802.11g and IEEE 802.11n modulation techniques. Applicants recognize that there are numerous wireless protocols that have been developed that, although not specifically listed, could be utilized with the present invention for data transfer purposes.

In addition, the wireless or wire data transfer can be connected to the Internet using the IP or DHCP protocols whereby the data can be monitored remotely over the Internet using a software program designed to record, display, analyze and/or audit the water parameter data. The present invention would probably have to "log on" to a server to report the water parameters or it could respond to queries once its presence is known to the server.

Also some wireless routers support a form of "private" point-to-point or bridging operation which could be used to transfer water parameter data from the present invention to a receiving apparatus. Other kinds of proprietary protocols to be used with the present invention are possible as well. For example, there are the ISM (industrial, scientific and medical) bands. The ISM bands are defined by the ITU-R in 5.138, 5.150, and 5.280 of the Radio Regulations. Individual countries' use of the bands designated in these sections may differ due to variations in national radio regulations. Because communication devices using the ISM bands must tolerate any interference from ISM equipment, these bands are typically given over to uses intended for unlicensed operation, since unlicensed operation typically needs to be tolerant of interference from other devices anyway. In the United States of America, ISM uses of the ISM bands are governed by Part 18 of the FCC rules, while Part 15 Subpart B contains the rules for unlicensed communication devices, even those that use the ISM frequencies. Part 18 ISM rules prohibit using ISM for communications.

The ISM bands defined by the ITU-R are:

| Frequency range [Hz] | Center frequency [Hz] |
|---|---|
| 6.765-6.795 MHz | 6.780 MHz |
| 13.553-13.567 MHz | 13.560 MHz |
| 26.957-27.283 MHz | 27.120 MHz |
| 40.66-40.70 MHz | 40.68 MHz |
| 433.05-434.79 MHz | 433.92 MHz |
| 902-928 MHz | 915 MHz |
| 2.400-2.500 GHz | 2.450 GHz |
| 5.725-5.875 GHz | 5.800 GHz |
| 24-24.25 GHz | 24.125 GHz |
| 61-61.5 GHz | 61.25 GHz |
| 122-123 GHz | 122.5 GHz |
| 244-246 GHz | 245 GHz |

While currently the 430 MHz and 900 MHz frequencies are commonly used in the US, it is anticipated by the Applicants that the other frequencies could be used for water parameter transfers such as Zigbee.

Another protocol known as CAN or CAN-bus (ISO 11898-1) that was originally designed for automotive applications, but now moving into industrial applications is another type of network that could be used to transfer water parameter data. Devices that are connected by a CAN network are typically sensors, actuators and control devices. A CAN message never reaches these devices directly, but instead a host-processor and a CAN Controller is needed between these devices and the bus.

The third optional wireless long range WiFi3, Zigbee, LoRa, Sigfox, Ultra Narrow Band (UNB), WiMAX, 6LoW-PAN or cellular communication means 46 is designed to communicate data under a cellular format technology with offsite central monitoring computer or cell, mobile or other telephone lines via satellite, microwave technology, the internet, cell tower, telephone lines It is anticipated that the third wireless communication means 46 can transmit information to a programmed cell or phone number for communicating water parameter data or alarm situations to the owner or a municipal/governmental agency (such as announcing a water leak situation). Also, the third wireless communication means 46 should include specific identification information e.g. house or commercial building address. The third wireless communication means 46 can send data on various frequencies, e.g. once per minute, once per hour, once per day, or can send information upon sensing the initiation or water use (water event basis to the programmed cell or phone number. The water meter with leak detection capability 10 (and 126 in FIGS. 6 and 200 in FIG.

7) can be programmed to communicate at other time frequencies, such as every 5 seconds or every minute, on a water event basis for various purposes, for example, to identify leaking conditions. The request signal can be generated by, for example, a request signal transmitted by a remote station (not shown). The use of the request signal can minimize the use of wireless signals within the house or commercial building, conserving energy, minimizing the interference with other wireless devices, and reduce the exposure of wireless energy to individuals. Furthermore, the third wireless communication means 46 can consist of two-way transmission, commonly known as transceiver technology, such that water meter and leak detection system 10 (and 126 in FIGS. 6 and 200 in FIG. 7) can transmit and receive electronic signals from the remote station and similarly, the remote station can transmit and receive electronic signals from the water meter and leak detection system 10 (and 126 in FIGS. 6 and 200 in FIG. 7). The third wireless means 46 can also be designed for communicating to an offsite central monitoring computer or cell, mobile or other telephone lines via satellite, microwave technology, the internet, cell tower, telephone lines, and the like. The third communication means 46 can also comprise a RF mesh-enabled device (meters, relays) is connected to several other mesh-enabled devices, which function as signal repeaters, relaying the data to an access point. The access point device aggregates, encrypts, and sends the data back to a municipal or government agency over a secure commercial third-party network. The resulting RF mesh network can span large distances and reliably transmit data over rough or difficult terrain. If a meter or other transmitter drops out of the network, its neighbors find another route. The mesh continually optimizes routing to ensure information is passed from its source to its destination as quickly and efficiently as possible. The third optional wireless communication can be either one-way transmission, or half duplex and/or full duplex two-way transmission. This third wireless technology 46 is designed for long range uses that can communicate with remote computers, for example, municipal and government uses, control, and billing practices. It is anticipated that the billing practices can be conducted by a corporate entity. This third wireless technology 46 can also be used to communicate with a home resident or corporate individual on their typical cell phone, smart phones, or similar apparatus 400.

One important technological feature of the present invention is secure data communication. Each water meter and leak detection device must be able to reliably and securely communicate the information collected to some central location. Considering the varying environments (e.g. underground location) and locations where present invention meters are found, solutions are formidable. Not only the wireless technology used for communication purpose, but the type of network used is also critical (fixed or single wireless, mesh network or a combination of the two). There are several other potential network configurations possible, including the use of Wi-Fi and other internet related networks. To date no one solution seems to be optimal for all applications. Rural municipalities may have different communication problems from urban utilities, or utilities located in difficult locations such as mountainous regions or areas not served by wireless and internet companies.

TCP/IP technology has become a common communication and management platform for sensor(s) to device applications, so software developers can utilize multiple communication systems while using TCP/IP technology. TCP/IP is a combination of two technologies where TCP comprise the fourth layer, and IP comprises the third layer, of the network and transport sections of the Open Systems Interconnect model (OSI model). Other solutions suggest the use of a single, universal connector separating the function of the smart mesh device and its communication module. A universal metering interface would allow for development and mass production of smart meters and smart mesh transmitting devices prior to the communication standards being set, and then for the relevant communication modules to be easily added. This would lower the risk of financially investing in or committing to the wrong standard. In addition, using the TCP/IP standard could allow a single water meter device to be used globally even if regional communication standards differ. The cellular format technology or other communication means can be used to transfer or download water parameter data from a residence/commercial operation, or well operation, to a remote monitoring site, or used to upload data, information or software updates to the water use and water energy use monitoring display apparatus 10, 126. In addition, the water monitoring and leak detection capability of the present invention, can use the cell tower or other communication means to communicate an alarm or message that a leak has developed in the residential/commercial or well water system. This water meter with leak detection 10, 126 will have an identification means that can call either a programmed cell or phone number or can send the alarm or message to a governing utility or municipality. Digital signals and data can be communicated directly through wiring or wireless means 46, 52, and 54. This leak identification means can call either a programmed cell or phone number or can send the alarm or message to a governing utility or municipality. Digital signals and data can be communicated directly through wiring or wireless means 46, 52, and 54.

Now referring to FIG. 2, the water meter and leak detection system display apparatus 10 includes a housing 20, a computerized circuit board having a power source 87, the display means housing having a water tight door 24 for replacing or regenerating the power source (shown in FIG. 8) and an one or more buttons or activators that allow for certain modification of the software instructions (change units, input timing, alarms). The housing 20 can be fabricated from a metallic material such as brass, brass alloys, steel, galvanized steel, copper, copper allows or any combination thereof. The display means housing can be fabricated from several polymeric materials, such as polyvinyl chloride (PVC), polyethylene, polybutylene, acryaontirile-butadiene-styrene (ABS), rubber modified styrene, polypropylene, polyacetal, polyethylene, or nylon. The base material can be painted white or colored finishes or coated with various brass, silver and gold type materials to accommodate the match with various presently marketed finishes. FIG. 2 shows a input for cold water and a input for hot water and an output for the cold water and a output for the hot water. The embodiment is necessary for monitoring the ratio of hot and cold water use. However, the water meter and leak detection system can have a single input cold or ambient water and a single output of cold or ambient water.

The display as presented in FIG. 2 utilizes one or more illuminating technologies, such as LCD, LED, gas plasma, fluorescence, incandescent, halogen, halide, or other lighting technologies but must able to provide sufficient lighting for observing the data in shower conditions for the shower monitoring apparatus. In addition, the display means, and display means housing must be able to sustain capability in moist wet conditions for both the shower monitoring apparatus and the water meter and leak detection system. The present invention can include one or more than one display parameter. For example, a unit with only the temperature display can be manufactured to reduce overall costs. Furthermore, the orientation of the parameters 140, 142, and 144 presented can be changed, for example, the flow parameter can be on top with the time parameter on the bottom and with the temperature parameter sandwiched between. The displays 140, 142, and 144 can have a background light that is used for various purposes, for example, for providing better lighting conditions or changing color e.g. from green to red, to display an alarming condition. Displaying of all water parameters 140, 142 and 144 can utilize a gang multiple LCD, LED, gas plasma, fluorescence, incandescent, halogen, halide, or other lighting technologies separate displays, custom displays, graphic displays or a single line display which sufficient digits that sequences the presentation of the water parameters 140, 142, and 144 one at a time with a specific delay and sequencing. Only as an example, the LCD unit that can be used with the present invention is the color graphic 128×128 LCD-00569 marketed by Sparkfun Electronics in Boulder, Colo. It is anticipated by the Applicants that there are other variants and other LCD, LED, gas plasma, fluorescence, incandescent, halogen, halide, or other graphic or lighting technologies that can be utilized with the present invention.

Now referring to FIG. 3, shown is a is a timing clock integrated circuit 88 with data transfer means 89 for communicating with the CPU or microprocessor, or microcontroller 84 and having a power line 85 and ground line 86. The timing circuit 88 can communicate with the CPU, microprocessor, or microcontroller 84 to an optional display 80 such information such as the time of day and current date and/or a time stamp for the duration that the water supply has turned been on and off. For monitoring the time stamp parameters of the water flowing through the present invention, the use of various trip switches or water sensors near the flowing water can be monitored. The timing clock IC 88 will assists by communicating a signal to the CPU or microprocessor 84 that the water supply has been turn on and then shut off such that the software instructions and CPU or microprocessor can calculate various parameters, such as, but not limited to, the duration of water supply, total number of gallons or liters of water used and flow rates.

An optional temperature sensor 93 with a data transfer means 92 for communicating with the CPU, microprocessor and/or microcontroller 84 and having a power line 96 and ground 97. Also shown is one or more flow sensors 105 (e.g. flow rate, pressure, ultrasonic, turbine, acoustic with a data transfer means 108 for communicating with the CPU, microprocessor and/or microcontroller 84 a power line 106 and ground line 107. Any associated integrated circuits for the timing clock 88, temperature sensor 93 and flow sensor 105 can include circuitry to convert analog data to a digital format. Also shown is a first wireless electronic communication radio or means 58 consisting of Bluetooth, Bluetooth low energy (BLE), Z-wave and Zigbee and other similar short-range wireless technology 102 with a data transfer 59. A second wireless electronic communication radio or means 61 with a data transfer 62 consisting Wi-Fi and WiFi3 and other similar wireless technology where data transfer means 62 communicates with the CPU 84. A third wireless electronic communication means 63 with a data transfer means 64 consisting LoRa, Sigfox, WiMAX, Ultra Narrow Band (0 MB), 6LoWPAN and other similar long-range wireless technology where data transfer 64 communicates with the CPU 84. The third wireless communication can also include cellular technology (46 as shown in FIG. 1) that is designed to communicate data utilizing a cellular format (standard 2G, 3GPP or LTE-M and LG5 cellular) with connection to offsite central monitoring computer using cell towers and other telephone lines via satellite, microwave technology, and the internet. Such cellular format could be CDMA, GSM or another advanced cellular formats (3GPP/LTE-M and 5G). The water meter and leak detection system can use any combination of the wireless electronic communication 58, 61, 63. Meters can have removable replacement modules that can be exchanged such that different types of wireless technology modules can be changed in the manufacturing factory or in the field to accommodate wireless needs in different environmental situations.

Also shown in FIG. 3 is an optional display 80 with a power line 81 and ground line 82. The display can utilize LCD, LED, gas plasma, fluorescence, incandescent, halogen, halide, or other lighting technologies.

An optional water energy generator 95 with data transfer communication 99 for communicating with the CPU (microprocessor and/or microcontroller) 84 with a power line 78 to the main power supply 98. The water energy generator 95 can be a turbine, paddle, Pelton type or other similar technology. Recharging batteries 87 or super capacitors 94 can be accessed from a water-resistant door of the collection node housing or with a water-resistant electrical coupler on the housing where the battery(ies) reside outside of the housing for periodic maintenance.

Also shown is an optional pressure transducer or sensor 65 with date transfer communication 67 and a power line 69 and ground line 68. The optional pressure transducer or sensor 65 can be used to provide pressure waves and changes in pressure when water use devices are actuated. The optional pressure transducer or sensor 65 can also be used to monitor pressure loss over a time when the control valve is closed as a leak test.

In efforts to save energy due to wireless transmission and CPU operations, a wake-up button 104 can be included the function to initialize electrical energy after the system goes into a sleeping mode. The wake-up button has a date communication line 111 to the CPU (microprocessor and/or microcontroller). The wake-up button 104 preferably is controlled by software that automatically initiates monitors water use and wireless communication upon the initiation of water flow.

Main power 98 produces a power line 85 and a ground line 86. The main power 98 is preferably one or more batteries 87 and/or on or more super capacitors 94 as the power source. With the one or more batteries or super capacitors, is would be preferable to have the water energy generator 95 to supplant energy when generated during periods that water flow occurs. An example of long-life batteries that can be used with the water meter and leak detection system 10 (126 shown in FIGS. 6 and 200 shown in FIG. 7) are the industrial lithium thionyl chloride (Li-SOCl$_2$)) bobbin-type or spiral wound batteries produced by companies such as Tadiran Battery company. Super capacitors store energy by means of a static charge caused by a voltage differential on position and negative plates. Super capacitors should have a high capacitance which is ideal for applications that require frequent charging and discharging at high current and a short duration. A super capacitor can also operate like a battery with the addition of special electrodes and electrolytes to increase its energy density. Higher voltage can be produced, but the trade-off is shorter service life. To obtain higher voltage, super capacitors must be connected in series. When two or more super capacitors are connected in series, protective circuitry is required to prevent any cell from going over-voltage. The self-discharge rate of a super capacitor can be much higher than a Li-ion battery, as certain super capacitors can discharge 50% to 100% of their available capacity in 30 to 40 days. A LiSOCl$_2$ bobbin type battery with a hybrid super capacitor would be an ideal primary cell power source that offers the highest capacity and highest energy density of any sole lithium cell, along with an extremely low annual self-discharge rate.

It is anticipated that solar panels (water meter and leak detection system box cover) or wind generator can be also used to supplant electrical energy. It is also anticipated that AC or DC (AC-DC adapter) can be used for electrical energy.

The CPU 84 that processes the information supplied by the flow sensor 105, the optional temperature sensor 93, the optional pressure sensor 65, and timing circuit 88 uses internal instructions to control the information projected on a display, transferring water use data by wired or wireless communication, and for processing leak detection alarm states. The microprocessor can include an EEPROM or any type of memory section that allows for specific programming to be incorporated as processing instructions. Furthermore, the microprocessor may have the capability to convert analog signals into digital information for decoding and processing. The CPU can have Analog-to-Digital Inputs that can provide the means for converting the information obtained from the flow sensor 105, the optional temperature sensor 93, the optional pressure sensor 65 from its analog format into a digitized form for processing by the instruction sets of the CPU or microprocessor 84. It is anticipated by the Applicant that more powerful microprocessors with more memory capacity may be utilized to accommodate the more complex operations. There are many other variants or other microprocessors, whether commercially marketed or privately fabricated, that can be used with the present invention.

In addition, a means to record and digitally store the water parameters or data can be incorporated into the present invention. An integrated memory circuit can be incorporated into the CPU or microprocessor 84, or can be a separate memory circuit, and can include associated circuitry with a means to transfer the recorded data to a removable media, such as a flash mount on an electronic circuit board to control the display means and communicate with the sensors. Various data access ports, such as serial, parallel, or USP can be used to transfer the stored data to another device, such as a computer. The CPU or microprocessor 84 and associated circuitry mounted on the electronic circuit board can also have the capability to be programmed for controlling certain display means (e.g. U.S. or metric units), programming alarm or setting states (e.g. flash all display means red when the total volume has exceeded a certain volume, for example, 175 gallons/day).

Because the water meter and leak detection system (126 shown in FIGS. 6 and 200 shown in FIG. 7) can be used in situations where the source of water comes for a well or non-commercial operation, and furthermore, where the commercial operations water treatments plants are under pressure to provide more water supplies or where problems, breakdowns or accidental situations can cause contamination of the water source, the present invention can be fitted with, display parameters of, and provide warning for, numerous mineral, elements and biological contaminates.

Not shown but could be included with the water meter and leak detection system (126 shown in FIGS. 6 and 200 shown in FIG. 7) or added as a removeable and replacement modules as described herein, is the acoustic sensor technology and associated software that can be used to identify water valve movement.

As illustrated in FIG. 4 is a cross-section taken from the 3-3 line on FIG. 2 showing the sensors 70, 72, 74, 76, 78, 130, 132, 134 and 136 located within a piping joint connection 22 and their relative position of the sensors in the supply line lumen 38 and the connecting wires 71, 73, 75, 77, 79, 131, 133, 135, 137 for the display means.

In general, a sensor is a type of transducer. A direct type indicating sensors, for example, a mercury thermometer, is human readable. However, other sensors must be paired with an indicator or display, for instance, thermocouple sensor. Most sensors are electrical or electronic, although other types exist.

There are many types of sensors that can be used with the present invention. Since a significant small change involves an exchange of energy, sensors can be classified according to the type of energy transfer that they detect. The water meter with leak detection system measures or monitors the temperature of water flowing though the water supply piping using various thermocouples or thermistor sensor 70 as depicted in FIG. 4. In the alternate shower monitoring embodiment, for measuring or monitoring the temperature of the water flowing from the shower or bath head, the use of various thermocouples or thermistor sensors 70 as depicted in FIG. 4 is protruding within the water supply lumen 38 (or in close proximity to the water to be measured) and mounted within the articulating joint mechanism 22. Wires 71 are shown extending from the sensor 70 to electronically communicate with the CPU or microprocessor 84 and display unit.

It has been known that any conductor (such as a metal) is subjected to a thermal gradient, it will generate voltage. This additional conductor will then also experience the temperature gradient and develop a voltage of its own which will oppose the original. The magnitude of the effect depends on the various metal in use. Using a dissimilar metal to complete the circuit will have a different voltage generated, leaving a small difference voltage available for measurement, which increases with temperature.

The relationship between the temperature difference and the output voltage of a thermocouple is generally nonlinear and is approximated by a polynomial interpolation.

A variety of thermocouples are available, suitable for different measurements applications (industrial, scientific, food temperature, medical research, etc.). They are usually selected based on the temperature range and sensitivity needed. Thermocouples with low sensitivities (B, R, and S types) have correspondingly lower resolutions. Other selection criteria include the inertness of the thermocouple material, and whether or not it is magnetic. Commonly thermocouples use in many applications are type K (Cromel), J (Iron/Constantan), and T (Copper/Constantan).

A thermistor is a type of resistor used to measure temperature changes, relying on the change in its resistance with changing temperature. Thermistor is a combination of time words thermal and resistor.

Thermistors can be classified into two types depending on the sign of k. If k is positive, the resistance increases with increasing temperature, and the device is called a positive temperature coefficient (PTC) thermistor (Posistor). If is negative, the resistance decreases with in decreasing temperature, and the device is call a negative temperature coefficient (NTC) thermistor.

Thermistors differ from resistance temperature detectors in that the materials used in a thermistor is generally a ceramic or polymer, while RTDs use pure metals. The temperature response is also different; RTDs are useful over larger temperature ranges.

Other thermal technologies that can be employed include temperature sensors: thermometers, bi-metal thermometers and thermostats, heat sensors such as bolometers and calorimeter.

It is anticipated by the Applicant that various types of thermocouples or thermistors can be used for the present invention. It is not important what type of thermocouple or thermistor is utilized for monitoring or measuring the temperature of the water entering the shower head, bath head or water supply lines except that it is accurate for the appropriate temperature range monitored or measured.

In order to monitor or measure the flow rate of the water being delivered by the water supply line various flow measuring technologies are applicable to the present invention water meter and leak detection system. For measuring or monitoring the rate of the water flowing through water supply, the use of various flow sensors 105 or pressure sensors 65 as depicted in FIG. 3 are positioned near the water supply piping. Wires 108 and 67 are shown extending from the flow and pressure sensors 105 and 65, respectively, to electronically communicate with the CPU/microprocessor/microcontroller 84 and display unit.

One means to monitor flow parameter is to create a venturi, which constricts the flow in some fashion, and measure the differential pressure that results across the constriction. This method is widely used to measure flow rate in the transmission of gas or liquids trough pipelines and has been used since Roman Empire times. The venturi effect is all example of Bernoulli's principle, in the case of incompressible fluid flow through a tube or pipe with a constriction in it. The fluid velocity must increase through the constriction to satisfy the equation of continuity, while its pressure must decrease due to conservation of energy: the gain in kinetic energy is supplied by a drop in the pressure or a pressure gradient force.

In addition, the flow sensor 74 can be fabricated from pressure sensor technology. Pressure sensors are alternatively called pressure transducers, pressure transmitters, pressure senders, pressure indicators among other names.

Pressure sensors can vary considerably in technology, design, performance, application suitability and cost. Examples of pressure sensors are the pressure transducer (sensor) TI2C marketed by Anfield and for a differential sensor the Motorola MPX5700 series In addition, various flow measuring technologies can be utilized as the flow sensor 74 in the water meter and leak detection system or the shower monitoring apparatus. In general, a flow sensor is a device for sensing the rate of fluid flow. Typically, a flow sensor is the sensing element used in a flow meter. There are various kinds of flow meters, including invasive (sensor movement within the tubular structure or pipe that have a vane, wheel or turbine structure that is pushed by the fluid, and can drive a rotary mechanism, or other device to monitor the flow rate. Flow meters can use a displacement piston, pushing it against a calibrated spring which results in a qualitative method and can only be use to show if the flow is on or off. Non-invasive flow rate sensors (sensor outside of or non-moving with the fluid pipe) can be time-based or Doppler based ultrasonic technology or magnetic type flow sensors.

In addition, there are several types of invasive or mechanical flow meters that can be utilized with the present invention as the flow sensor 74 that are listed below.

Helix jet meters are popular at larger sizes. Jet meters (single or Multi-Jet) are increasing in popularity in the United Kingdom at larger sizes and are commonplace in the European Union.

The Pelton wheel, paddle wheel, an axial turbine translates the mechanical action of specifically shaped object or paddle rotating in the liquid flow around an axis that is translated into a user-readable rate of flow. To function properly, the specifically shaped object or paddle must be at least partially inserted into the flow.

In addition, non-invasive (generally outside of or non-moving within the water flow) the magnetic and ultrasound flow meters can be utilized with the present invention to function as the flow sensor 74. Modern innovations in the measurement of flow rate incorporate electronic circuitry to varying pressure and temperature The magnetic flow meter, commonly referred to as a "mag meter" or an "electromag". A utilizes a magnetic field is applied to a tubular structure that has electrical insulating properties.

The ultrasonic flow meters can measure water flow using two method; 1) transit time and 2) doppler shift the difference of the transit time of ultrasonic pulses propagating in and against flow direction. This time difference is a measure for the average velocity of the fluid along the path of the ultrasonic beam. By using the absolute transit times both the averaged fluid velocity and the speed of sound can be calculated.

Ultrasonic technology also utilizes measurement of the doppler shift resulting in reflecting an ultrasonic beam off the flowing fluid is another recent innovation made possible by use of modern electronic circuitry. Doppler shift technology monitors water flow rate by passing an ultrasonic beam through the water supply piping, bouncing the beam off of a reflective plate that reverses the direction of the beam and repeating the measurement such that the flow rate of water flow can be estimated. The speed of transmission is affected by the movement of water in the pipe and by comparing the time taken to complete the cycle upstream versus downstream the flow of water through the pipe can be measured. The difference between the two speeds is a measure of true volume flow.

Fluid flow rate can be measured through the use of a monochromatic laser diode. The laser probe is inserted into a water stream and turned on, whereby the laser light scatters and a portion is reflected back to the probe. The signal is then electronically processed to calculate flow rate within the water piping. There are limitations to the use of a laser doppler probe. The flow meter is more useful for relative rather than absolute measurements.

A signal or alarm can be incorporated into the present invention whereby a preset alarm or programmed alarm make an audio announcement on the smart central hub listening and speaker devices for example, "leak detected at irrigation system" or "water approaching freezing level", or "broken sensor".

It is anticipated that the present invention water meter and leak detection system can communication beyond the smart central hub listening and speaker device central audio devices. Now that there are several thermostats, such as the Nest Thermostats, the Ecobee4, the Honeywell Lyric or the International Netatmo, that have wireless capability that communicate with a wireless router, the present invention water meter and leak detection system can communication with these thermostats. For example, when the temperature of the water is approaching a freezing level, the present invention water meter and leak detection system can send a signal to the wireless thermostats to turn the heat in the residence or company on to a set temperature, e.g. 55 degrees Fahrenheit, to maintain the internal water lines from suffering from freezing pipe conditions, that can result in a burst pipe(s). It is anticipated that the present invention water meter and leak detection system can communicate with other devices such as the home security system, the garage door opener, or a wireless KeyFob.

In addition, the present invention water meter and leak detection system responds to audio commands. For example, the water shut off mechanism can turn the water supply off if an alarm or setting can be activated. A home owner can simply state on the smart central hub listening and speaker devices "Alexia, going on vacation for 10 days, turn off water but keep irrigation schedule on". This audio command programming the water meter and leak detection system schedule so that the water is turned off for 10 days but turns on, for example, with the programming irrigation schedule the water meter and leak detection system will turn on Monday, Wednesday and Saturday from 6:00 a.m. to 8:00 a.m. to allow the irrigation schedule to function.

The water shut off mechanism is electrically connected to the CPU or microprocessor and the power means such the computer controls the application of electrical power to activate or deactivate the water shut off mechanism. The water shut off mechanism can comprise, for example, a typical ball valve or solenoid shut off valve incorporate into the connection union such that water from the source is closed such that no water exits. The water shut off mechanism can be activated if an alarm state has been achieved, e.g. leak condition of 20 minutes has expired, or the total of 35 gallons of water has flowed since the water source was opening. The alarm or settings can be a default setting installed by the manufacturer or programmed by the user. In addition, the typical on-off ball valve or solenoid shut off valve can have a programmable on-off sequence for other purposes, for example, for vacation schedules.

In addition, as shown in FIG. 4, is an optional halogen (chloride or fluoride) sensor 76. There are currently several types sensors and technology are available on the commercial market that can be used with the present invention as chlorine and fluoride are common compounds or elements that are added to the water supply to maintain clean water. The sensor 76 communicates with the water meter and leak detection system 10, 126, 200 through wired 77 (or wireless means) which includes specific software instructions to display the halogen parameter on one of the displays or provide an alarm that is programmed that is triggered when a certain level or percentage is exceeded.

An optional Total Dissolved Solids (TDS) sensor 78 measures are the total amount of mobile charged ions, including minerals, salts or metals dissolved in a given volume of water, expressed in units of mg per unit volume of water (mg/L), also referred to as parts per million (ppm). TDS is directly related to the purity and the quality of water A TDS sensor or meter is based on the electrical conductivity (EC) of water c conductivity meter. Pure water has zero conductivity. Conductivity is generally calculated by multiplying the total cations or anions 100 times and expressed as equivalents. TDS comes from man organic sources such as leaves, silt, fertilizers and pesticides used on lawns and farms, from inorganic materials such as rocks and air that may contain calcium bicarbonate, nitrogen, iron phosphorous, sulfur, and other minerals. The sensor 78 communicates with the water meter and leak detection system 10 (126 shown in FIGS. 6 and 200 shown in FIG. 7) through wired 79 (or wireless technology) which includes specific software instructions to display the TDS parameter on one of the displays or provide an alarm that is programmed that is triggered when a certain level or percentage is exceeded.

In addition, as shown in FIG. 4, is an optional sensor 130 to measure or monitor the amount of metallic substances such as iron. Metallic or iron content in water can cause discoloration and other problems. It is anticipated by the Applicant that sensors for other metals, such as mercury, lead, or metallic elements can be utilized with the present invention. Mercury and lead consumption and exposure are known to be hazardous materials. One method known to measure iron in a water sample is to use a Hall sensor biased with a magnet. As the sensor is positioned over the iron, more flux will pass through the Hall sensor. The Hall sensor can only monitor metallic compounds that have magnetic properties. More recently a low-cost platinum with either two or four electrode sensor design has been described to monitor for lead and other metals. The sensor 130 communicates with the water meter and leak detection system 10, 126 through wired 131 (or wireless means) which includes specific software instructions to display the metallic or iron parameter on one of the displays or provide an alarm that is programmed that is triggered when a certain level or percentage is exceeded.

In addition, as shown in FIG. 4, is a biological or fecal coliform (bacteria) sensor 132 through wired 133 (or wireless technology). In general, increased levels of fecal coliforms provide a warning of failure water treatment, a break in the integrity of the distribution system, or possible contamination with pathogen. When levels are high there may be an elevated risk of waterborne diseases or gastroenteritis. The presence of fecal coliform in water system may indicate that the water has been contaminated with the fecal material of humans or other animals. Contamination from coliform bacteria can be sourced through direct discharge of waste from mammals and birds, from agricultural runoff, and from human sewage. Some waterborne pathogenic diseases that may coincide with fecal coliform contamination include ear infections, dysentery, typhoid fever, viral and bacterial gastroenteritis, and hepatitis A and C. Current treatments for the reduction of fecal coliform in wastewater may require the use of chlorine and other disinfectant chemicals. Such materials may kill the fecal coliform and disease bacteria. Municipalities that maintain a public water supply will typically monitor and treat for fecal coliforms. The sensor 132 communicates with the water meter and leak detection system 10 through wired 133 (or wireless technology) through wired 135 (or wireless technology) which includes specific software instructions to display the fecal contamination parameter on one of the displays or provide an alarm that is programmed that is triggered when an certain level or percentage is exceeded.

In addition, as shown in FIG. 4, is an optional pH sensor 134. Various pH sensors available in the current market can be utilized with the present invention. The sensor 134 communicates with the water meter and leak detection system 10 through wired 131 (or wireless technology) through wired 135 (or wireless technology) which includes specific software instructions to display the pH parameter on one of the displays or provide an alarm that is programmed that is triggered when a certain level or percentage is exceeded.

In additional, as shown in FIG. 4, is an optional water hardness sensor 136 through wired 137 (or wireless technology). Water is an excellent solvent for polar molecules and easily dissolves polar materials. Water combines with carbon dioxide to form very weak carbonic acid, an and carbonic acid has even better solvent characteristics. Calcium and magnesium dissolved in water are the two most common minerals that make water "hard." The degree of hardness becomes greater as the calcium and magnesium quantity increases such it creates a concentration of multivalent cations dissolved in the water. Hard water interferes with cleaning tasks including laundering and dishwashing, bathing and personal grooming. In addition, dishes and glasses may become spotted and may cause a film on glass shower doors, shower walls, bathtubs, sinks, faucets. Water flow may be reduced by mineral deposits in pipes which coats the sides of the pipe and reduce the luminal diameter.

Now referring to FIG. 5, which presents a more detailed example 110 of the first custom remote display and/or recording apparatus 50 or the second optional (handheld) display and/or recording apparatus 56. The first display/recording apparatus 50 or optional second (handheld) display and/or recording apparatus 56, represented as apparatus 110, includes a housing or container 112, display means 114, 116, and 118 and/or software control buttons 140, 142, and 144, the electronic circuit board (microprocessor) with wire or wireless capability, and power source which are common components between the two display and/or recording apparatuses. It is also anticipated that an optional third display/recorder (not shown) could utilized with computer or television that has an internet, intranet, wire or wireless means. In addition, it is anticipated by the Applicant that the first 50, second 56 and third display recorders could be a typical cell phone, smart phones, or similar apparatus includes all remote cellular phones using channel access methods defined above (with cellular equipment, public switched telephone network lines, satellite, tower and mesh technology), mobile phones, PDAs, tablets (e.g. refers to all current and future variants, revisions and generations of the Apple IPAD, Samsung Galaxy, HP, Acer, Microsoft, Nook, Google Nexus, Sony, Kindle and all future tablets manufactured by these and other manufactures), Apple IPOD Touch, a smart or internet capable television, wireless timepiece or wireless watch (Apple. Samsung) and other similar apparatus with WIFI and wireless capability, and remote computers and controllers having internet, wireless and/or cell format technology connectivity.

Also shown in FIG. 5, one or more ergonomically 120, 122, 124 placed buttons or activators which can be incorporated into the display means housing or container or touch screen software buttons 140, 142, and/or 144 to allow the modification of certain parameter units (e.g. metric to US), set alarm conditions (e.g. pH or Hardness to high), or to program certain settings, (e.g. setting specific TDS, pH and hardness level). The buttons will electrically communicate with the electronic circuit board and microprocessor 84 contained within the housing or container 112 and respond to programmed instructions integrated within the CPU or microprocessor 84 and associated circuitry of the electronic circuit board. The buttons or activators 120, 122 and/or 124 should be mounted with the display means housing or container 112 with the capability to protect the buttons and electronic circuitry with the housing for exposure to moist and wet conditions. It is also an alternative design to use touch sensitive display means or touch screen technology.

Also as shown in FIG. 3, but applicable to FIG. 5, is an CPU or microprocessor 84 and associated circuitry mounted on an electronic circuit board with a power source and contained within the first remote display and/or recording apparatus 50, or the second remote display and/or recording apparatus 56. The microprocessor 84 controls the display and/or recording apparatuses and communicates with the sensors. The CPU or microprocessor 84 and associated circuitry mounted on the electronic circuit board can also have the capability to be programmed for controlling certain display means (e.g. U.S. or metric units), programming certain alarm or setting states (e.g. flash all display means red when the total volume has exceeded a certain volume, for example, 150 gallons/day).

The display as presented in FIG. 5 in general means 64, 66, and 68 utilizes one or more illuminating technologies, such as LCD, LED, gas plasma, fluorescence, incandescent, halogen, halide, or other lighting technologies but must able to provide sufficient lighting for observing the data in shower conditions. In addition, the display means must be able to sustain capability in moist wet conditions. The present invention can include one or more than one display parameter. For example, a unit with only the temperature display can be manufactured to reduce overall costs. Furthermore, the orientation of the parameters 64, 66, and 68 presented can be changed, for example, the flow parameter can be on top with the time parameter on the bottom and with the temperature parameter sandwiched between. The displays 64, 66, and 68 can have a background light that is used for various purposes, for example, for providing better lighting conditions or changing color e.g. from green to red, to display an alarming condition. Displaying of all water parameters 42, 44 and 46 can utilize a gang multiple LCD, LED, gas plasma, fluorescence, incandescent, halogen, halide, or other lighting technologies separate displays, custom displays, graphic displays or a single line display which sufficient digits that sequences the presentation of the water parameters 42, 44, and 46 one at a time with a specific delay and sequencing. An example of a LCD unit that can be used with the present invention is the color graphic 128×128 LCD-00569 marketed by Sparkfun Electronics in Boulder, Colo. It is anticipated by the Applicants that there are other variants and other LCD, LED, gas plasma, fluorescence, incandescent, halogen, halide, or other lighting technologies that can be utilized with the present invention.

Also not shown in FIG. 5, one or more ergonomically placed buttons or activators can be incorporated into the shower head to allow the modification of certain parameter units (e.g. metric to US), set alarm conditions (e.g. low temperature set point, time past set point, flow rate set points), or to program certain settings, e.g. alarm, monitor continuous leakage (valve not complete shut off). The buttons will communicate with the electronic circuit board contained with the shower head 60 and respond to programmed instructions integrated within the CPU or microprocessor and associated circuitry of the electronic circuit board. The buttons or activators should be mounted with the shower head with the capability to protect the buttons and electronic circuitry with the shower head for exposure to moist and wet conditions. Alternately, the display means 64, 66, and 68 can be have touch screen or tablet type capability to allow for modifications of certain parameter units or program certain settings.

The central audio hub having intelligent listening and speaker capabilities (shown in FIG. 15) can be used for producing various sounds or verbal information. In the simplest form, the speaker can send out chiming or ring or other non-descript sounds to alert an individual of a particular situation, such as a critical temperature has been reached or an alarm state has been detected. In a more advanced form, the speaker can verbalize a product specific word or phrase to initializes a command or request or information. Amazon Echo Dot using the word "Alexa", Homepod uses "Siri", and Harmon Kardon used Microsofts "Cortana". After using the certain initializing word or phrases, the next words or phrases with be for parameter information or provide confirmatory responses to verbal or auditory command or instructions. For example, when one is planning on a vacation and they want to turn the water off (but maintain the irrigation schedule) the user can speak to the central audio hub having intelligent listening and speaker capabilities and an example say "Alexia, turn water off for 10 days starting tomorrow but maintain irrigation schedule".

The central audio hub having intelligent listening and speaker capabilities can respond for confirmation purposes an example like "Ok John, we have programmed your command for the 10-day vacation and will program the water meter and leak detection system". In additional, the central audio hub having intelligent listening and speaker capabilities reply to other audio or verbal commands for confirmation purposes, such as "Did you ask me to turn off the water?", "Want to enter programming mode?", or "Want to set to metric units?", etc. These are just examples as the Applicant anticipate that there numerous communications that can be exchanged between the user and the central audio hub having intelligent listening and speaker capabilities. The confirmation audio or verbal messages will function to minimize the occurrence of false positive commands whereby false commands might be generated from normal conservations or television/radio speakers that are near or are heard by the microphone. These examples are only exemplary, and it is anticipated by the Applicant that numerous other annunciated audio or verbal messages could be included in the present invention.

As referred to in FIG. 6, optionally flow sensor(s) can be mounted at appropriate locations with monitoring software incorporated into either the flow sensors or the water meter and leak detection system 10, 126 (and 200 in FIG. 7) can be employed to monitor leaks that are ascertained, that can communicate to the present invention water meter and leak detection system. A warning can be displayed on the first remote monitor or an immediate message can be sent to a programmed cell phone number by wireless communication means 46, 52 and/or 54. In this optional operation a plurality of wireless or wired water flow sensors 120a, 120b, and 120c can be installed in close proximity of the supply lines, for example washing machines, sprinkler systems, refrigerator water supply lines, and other potential leaking sites, The water use and water energy use monitoring display apparatus base unit 10, 126 (and 200 in FIG. 7) periodically reads and stores data point water flow information corresponding to either a flow condition, no flow condition, or a slow flow condition through the supply line of the particular water fixture. The water meter and leak detection system 10, 126 (and 200 in FIG. 7) is configured to periodically receive a stream of stored data points from the at least one wireless flow sensor node by way of at least one coordinator node. The water meter and leak detection system is configured to determine, based on an analysis of the stream of data points, whether a leak exists in at least one of the water fixtures. The water meter and leak detection system 10, 126 is designed, the when a leak is detected, to provide a warning light, display, or alarm, or using the wired or wireless technology or third communication means 46, 52 54, 101, 102 and/or 103 to communicate the leak condition to a resident, commercial unit operator or manager, repair service person and/or municipal or governmental agency. The communication can be wirelessly transmitted by Bluetooth, Bluetooth Low Energy, Wi-Fi, WiFi3, Zigbee, Z-Wave, LoRa, Sigfox, Ultra Narrow Band (UNB), WiMAX, 6LOWPAN and cellular or cell format technology, microwave technology or satellite communication technology.

The present invention water meter and leak detection system 10, 126 (and 200 in FIG. 7) can be programmed to automatically send a signal to the turn off the main water supply when a leak is sensed. If there are independent water control devices mount remotely from the water meter and leak detection system 10, 126 (and 200 in FIG. 7) the water meter and leak detection system node can, with multiple sensors positioned around a residence or corporation, government agency or institution, it can also send out the location of the leak, e.g. at the washing machine, kitchen faucet, water heater. It is anticipated that a single water flow sensor located at the water meter and leak detection system 10, 126 (and 200 in FIG. 7) can function to determine the presence of a leak. The software can monitor the single flow sensor and if the water flow continues for a long period of duration and/or to flow rate is extremely high and continues, a leak condition comprising a broken pipe, faucet left on, or water heater failure, other condition, can initiated an alarm and then text or email messages sent to a cell phone, smart phone or similar apparatus 400, show visual lights or audio sounds, or the water control mechanism can be programmed to automatically shut off the main water supply to the residence or corporation.

The sensor 136 communicates with the water meter and leak detection system apparatus 10, 126 through wired 13 (or wireless means) which includes specific software instructions to display the pH parameter on one of the displays or provide an alarm that is programmed that is triggered when a certain level or percentage is exceeded. The water parameter use and monitoring apparatus can use a typical cell phone, smart phones, or similar apparatus includes an application (APP) for a consumer/resident, corporate entity, or municipality that show water quality parameters.

Referring to FIG. 7, the water meter and leak detection system 10, 126, 200 with water shut-off/on mechanism 310 is strategically located between a main supply line 208 from a water main and a household water supply line 210 to a private and/or public property(ies) 202. The The water and leak detection 10, 126, 200, with water shut-off/on mechanism can be activated and deactivated by a remote controller 220 to selectively turn on and off the water through the household water supply line 210. In the preferred embodiment of the present invention, the water meter and leak detection system 10, 126, 200 with water shut-off/on mechanism 310 is located with respect to the water supply line 208 such that water flow through the water supply line 210 to the living quarters of the private and/or public property(ies) 202 may be prevented while still allowing water flow to non-residential areas, such as to sprinkler lines.

It is anticipated by the Applicant that separate water shut-off/on mechanisms 310 can located on the water supply line 208 and the irrigation water supply lines. The multiple water shut-off/on mechanisms will have electrical circuitry and wireless radios such they can be controlled remotely through communication and commands/signals with the remote server over the internet from a cell phone APP. It is also anticipated by the Applicants that the water meter and leak detection system with leak detection system 10, 126, 200 with water shut-off/on mechanism 310 can take the place of, and function as, the main water meter and leak detection system and/or incorporate a pressure reduction valve (see FIG. 9). FIG. 7 also shows the Water meter and leak detection system and Leak Detection System 10, 126, 200 with water shut-off/on mechanism 310 connected with a wired means 205 from a solar electrical generation 204 and/or connected with a wired means 207 from a wind electrical generation 206. In this regard, the water meter and leak detection system and Leak Detection System 10, 126, 200 with shut-off/on mechanism 210 can be battery operated and utilize re-chargeable batteries or super capacitors that can be charged with a water turbine electric generator or have typical batteries that are replaceable. The water meter and leak detection system and Leak Detection System 10, 126, 200 with shut-off/on mechanism 310 can also be AC or DC powered. An antenna 322 is shown extending from the water meter and leak detection system collection node with water shut-off/on mechanism.

The water meter and leak detection system 10, 126, 200 can incorporate a freeze design feature (not shown) which, before the water approaches a freezing condition (32 degrees Fahrenheit, 0 degrees Celsius), activates a freezing mechanism. This technology is analogous can function like the commonly called "frost plugs" or "freeze plugs". This protects the more expensive water meter and leak detection system 10, 126, 200 and private and public building water distribution piping by sacrificing the less expensive and easy to install frost/freeze plug. The optional frost/freeze plug technology is typically used in outside underground pits or poorly heated garages or utility rooms. In some extraordinary freezing situations, the optional frost/freeze plug can be incorporated with a draining mechanism or system (not shown) that allows the water to passively drain from the private or public property(ies) water pipes or forcefully removes the water from the water pipes with a power system. Another method to protect from freezing conditions is to use a three-way control valve whereby the third port drains water from the private or public property(ies). Software will be designed to position the three-way control valve in an open position, a closed position and a water draining position. And it is anticipated that in these extraordinary freezing situations, the draining mechanism or system can also replace the water in the water pipes with air, nitrogen or other gas/liquid that have low freezing points and non-toxic conditions, are can withstand the freezing conditions to minimize damage to the water pipes. Furthermore, be communicating with a home router, the water meter and leak detection system 10, 126, 200 can communicate with intelligent thermostats sending a signal to turn on the residential or corporation heat to a temperature that will inhibit freezing water in the residential and corporation interior water pipes.

The water meter and leak detection system 10, 126, 200 with water shut-off/on mechanism 310 software controls when water is interrupted or allowed to flow into the private or public property(ies) facility or building, or to help program the for scheduled water interruption times (off from 8:30 a.m. until 4:30 p.m. then on, off again at 11:00 p.m. until 5:00 a.m. and then on again). A display means 211 can display calendar information, such as the date and current time (12 hr. or 24 hr. format). The water meter and leak detection system collection node 200 can be programmed using a wire or wireless technology such as an alarm system or use touch screen button technology on the display. The display and display housing must be able to sustain capability in outdoor wet and/or hot/freezing conditions. The display 211 can have a background light that is used for various purposes, for example, for providing better lighting conditions or changing color e.g. from green to red, to display an alarming condition. The display can utilize touch screen technology.

One of the key features of the water meter and leak detection system 10, 126, 200 is that it has a convenient means that facilitates activation and/or deactivation of the water flow from the main water supply when a private or public property(ies) facility or building when it becomes vacated or unsupervised. In this regard, shown in FIG. 7, is an individual 212 holding a cell phone, smart phones, or similar electronic mobile apparatus 400 for communicating with the water meter and leak detection system 10, 126, 200 to control the water flow.

For leak detection capability is would be preferred that the water meter and leak detection system 10, 126, 200 with a water shut-off/on mechanism 310 include programming instructions with a timing circuit to a user defined time schedule. In this manner, the private or public property(ies) owner may simply establish that the water supply will be shut off or blocked during non-working hours, during a vacation, and/or during sleeping hours. The scheduling could be a daily, weekly, monthly or annual or on a water use basis. The programming of the timing schedule could be input into the CPU of the water meter and leak detection system collection node or the communication hub or receiving station via various methods, e.g. wireless or wired communication with a computer with appropriate software, using the remote controllers, using touch screen technology on the display means, or cell phone, smart phones, or similar electronic mobile apparatus 400.

Now referring to FIG. 8, shown is a perspective more detailed view of the water meter and leak detection system 10, 126, 200 with water shut-off/on mechanism 310 and water supply plumbing, and with optional water turbine generator 308 that is located within the water supply line. The water supply line from the water main 208 can optionally include a manual shut off valve 300 with handle 302. The manual shut off valve 300 can be a ball valve, solenoid valve, gate value type, piston valve, or other known technology. Further along the water supply line is a pressure regulator 304 with a connecting pipe 306 to the water meter and leak detection system 10, 126, 200 with water shut-off/on mechanism 310. Also shown is an optional water turbine generator 308 that could be utilized to produce electrical energy for recharging the battery source 326. The water shut-off/on mechanism 310 can be a ball valve, solenoid valve, gate value type, piston valve, or other known technology with electronic activation. A mechanical lever or electric button/toggle switch 311 can be incorporated on the water shut-off/on mechanism to allow the modification of the mechanism to open or close the water flow in emergency and necessary situations. The water meter and leak detection system 10, 126, 200 has a transceiver 320 that includes an antenna 322 which can be external or internal. The control circuit for the Water meter and leak detection system and Leak Detection System 10, 126, 200 shown in more detail in FIG. 3, includes programmable CPU, a power source using either a battery or super capacitor (rechargeable) 326 or typical AC or DC supply 324, and/or electrical circuitry, wireless or hard-wired components, and optional sensors and associated circuitry. Also shown is a battery voltage 326 which would electronically engage the optional solar cell 302 or wind generator 206 to provide additional electrical energy. It is anticipated by the Applicant's that the water shut-off/on mechanism 311 (ball valve or solenoid shutoff valve), and if used, the optional water turbine generator 308, could be incorporated within the water meter and leak detection system 10, 126, 200 as a single unit. It is also anticipated that the water meter and leak detection system 10, 126, 200 with water shut-off/on valve 310 could replace and additionally include the function of a pressure regulator (see FIG. 9), eliminating one of the components shown in this drawing. Exiting from water meter and leak detection system 10, 126, 200 with water shut-off/on mechanism 310 is the main water supply 312 to the private or public property(ies) building or structure. It is also anticipated that water meter and leak detection system 10, 126, 200 with water shut-off/on valve 310 could replace, and function as, the main water meter and leak detection system.

FIG. 9 is another embodiment of the water meter and leak detection system 10, 126, 200 with a perspective detailed view of the water shut-off/on mechanism combined with an independent pressure regulator or reduction valve and functioning as a combined system consisting of a water meter and leak detection system collection node with one or more water flow sensors having a water shut-off/on mechanism and pressure reduction valve. Shown is a typical water pressure reduction valve 304 connected directly with the water meter and leak detection system 10, 126, 200 with water shut-off/on mechanism 200 having a ball valve 310, a manual on-off handle 311, an electric motor 315, electrical circuitry 314 with a wireless antenna 322.

Now referring to more detail in FIG. 10, (with additional application programs, or APPs, as shown in FIGS. 11, 12, 13) where water parameter data can be display on a cell phone, smart phone, computer and similar electronic apparatus 400.

FIGS. 10-13 show a cell or smart phone, computer, or similar apparatus 400 running an "APP" or a sequence of "APP" pages that show, in a pie chart, bar chart, or other format, the water uses of particular areas of the private and/or public property(ies). The water meter and leak detection system's flow rate sensor(s) and software calculate of the using the water flow rate, water use duration, and total volume of water to differentiate water use devices (e.g. shower, faucet, bathtub, toilet, washing machine, water heater, dishwasher, and outside irrigation system) can be to show the water uses. Other outdoor water uses such as pool or hot tub or water fountain water maintenance can be included for water use monitoring. The addition of an acoustic sensor can monitor valve movement, vibration, and noise patterns (sound and pressure patterns) which can sense water valve position or movement, with the water Weber meter and leak detection system 10, 126, 200 can provide more specific differentiation of water use devices. Using AI software technologies, the acoustic sensor could be calibrated to monitor water rate flow and water pressure.

The cell phone, smart phone or similar apparatus 400 or custom display and/or a recording apparatus 50, 56 and 110 has the convenient function of providing an individual or entity to review water use and water parameter data on a real time basis for auditing or monitoring purposes. The wireless communication means can use radio-frequency, Bluetooth, Bluetooth low energy (BLE) ZigBee Wi-Fi, Wi-Fi3, LoRa, Sigfox, 6LoWPAN, Ultra Narrow Band (UMB), standard cellular or advanced 3GPP and LTE-M and 5G cellular technology or other wireless technology for transferring the water parameter data generated by the sensors and collected by the microprocessor and sent by wireless communication technology for data transfer through either a private or public network system and/or the optional collection hub or receiving station to an internet router. And command signals can be sent back to the water meter and leak detection system 10, 126, 200 with water shut-off/on mechanism 310 or software updates, activate or deactivate the water shut-off/on mechanism. Examples of Bluetooth modules (using the 2.4 GHz band) that can be added to the present invention are the RN-41 Bluetooth modules available from Roving Networks in Los Gatos, Calif., the KC-41, KC 11.4, KC-5100, KC-216 or KC-225 data serial modules from KC Wireless in Tempe Ariz., the Proton or Electron from Particle (formally Spark) in San Francisco, and/or the BT-21 module from Amp'ed RF wireless solutions in San Jose, Calif. Examples of wireless protocols that can be utilized with the present invention include, but are not limited to, the IEEE 802.11a, IEEE 802.11b, IEEE 802.11g and IEEE 802.11n modulation techniques and the newer protocol associated with Wi-Fi3. Another example of the wireless protocols that can be utilized with the present invention is the ZigBee, Z-wave and IEE 802.15.4 modulation technology. Furthermore, wireless low power and long-range technology known as "LoRa" marketed by many manufactures such as Semetech and the HopeRF RFM95 W-915S2 can be used with the present invention. Ultra Narrow Band chips are marketed by Texas Instruments as CC1125 Ultra High-Performance RF Narrowband Transceiver. Applicants recognize that there are numerous wireless protocols that have been developed that, although not specifically listed, could be utilized with the present invention for data transfer purposes The water meter and leak detection system 10, 126, 200 with water shut-off/on mechanism 310, that transmits water parameter data to a router that connects to the internet and then to remote computers/servers, can also communicate the water leak condition with a user or owner of a home, condo, apartment or other residence, rental/leased house, condo or apartment or other resident, owner or representative of a company or corporate entity, owner or staff of a hotel/motel, institution facility, and/or a governmental agency, housing or facility using a cellular format technology that refers to all current and future variants, revisions and generations (e.g. third generation (3G), fourth generation (4G), fifth generation (5G) and all future generations) of Global System for Mobile Communication (GSM), General Packet Radio Service (GPSR), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA, Integrated Digital Enhance Network (iDEN), HSPA+, WiMAX, LTE, Flash-OFDM, HIPERMAN, WiFi, IBurst, UMTS, W-CDMA, HSPDA+HSUPA, UMTS-TDD and other formats for utilizing cell phone technology, telephony antenna distributions and/or any combinations thereof, and including the use of satellite, microwave technology, the internet, cell tower, telephony and/or public switched telephone network lines. The wireless communication of water leaking conditions can be between the water meter and leak detection system 10, 126, 200 with water shut-off/on mechanism 310 and a typical cell phone, smart phones, or similar apparatus includes all remote cellular phones using channel access methods defined above (with cellular equipment, public switched telephone network lines, satellite, tower and mesh technology), mobile phones, PDAs, tablets (e.g. refers to all current and future variants, revisions and generations of the Apple IPAD, Samsung Galaxy, HP, Acer, Microsoft, Nook, Google Nexus, Sony, Kindle and all future tablets manufactured by these and other manufactures), Apple IPOD Touch, or a television, watch, timepiece or fob watch and other similar apparatus with WIFI and wireless capability, and remote computers and controllers having internet or wireless connectivity. The display of the water leaking condition data can be in various pleasing format using digits, analog display, graphics, pictures, charts and/or other characters to exhibit the leaking condition to a user. Also, the transfer of data can use authentication, encryptions, integrity and non-repudiation technology to ensure that data or information is communicated securely.

The water meter and leak detection system 10, 126, 200 with water shut-off/on mechanism 310 can also function to monitor the water use in homes, companies, buildings or other structures by including either sensitive flow sensors, standard invasive flow sensors, (e.g. turbine, Pelton, paddle wheel flow, piston, and pressure sensors and other invasive sensors), non-invasive flow use sensors (e.g. Doppler or time-transit ultrasonic, laser or magnetic flow sensors and other non-invasive flow use sensors) to communicate either or both the inside and/or irrigation water flow use on a real time, daily, weekly, monthly, and/or yearly basis or on a water use basis. Such water flow use data can be transferred to a remote central monitoring computer service, municipality or government agency, via cell towers, satellite, microwave technology, the internet, telephone lines, and the like. The water meter and leak detection system 10, 126, 200 that transfer water parameters and data to the internet and to remote computer/servers can also communicate with a user or owner of a home, condo, apartment or other residence, rental/leased house, condo or apartment or other resident, owner or representative of a company or corporate entity, owner or staff of a hotel/motel, institution facility, and/or a governmental agency, housing or facility using a cellular format technology that refers to all current and future variants, revisions and generations (e.g. third generation (3G), fourth generation (4G), fifth generation (5G) and all future generations) of Global System for Mobile Communication (GSM), General Packet Radio Service (GPSR), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA, Integrated Digital Enhance Network (iDEN), HSPA+, WiMAX, LTE, Flash-OFDM, HIPERMAN, Wi-Fi, IBurst, UMTS, W-CDMA, HSPDA+HSUPA, UMTS-TDD and other formats for utilizing cell phone technology, telephony antenna distributions and/or any combinations thereof, and including the use of satellite, microwave technology, Wi-Fi, WIMAX, Wi-Fi3, LoRa technology, the internet, cell tower, telephony and/or public switched telephone network lines. The wireless communication of real time, daily, monthly, weekly, monthly, and/or yearly water indoor and irrigation water use can be between the water meter and leak detection system 10, 126, 200 and a typical cell phone, smart phones, or similar apparatus includes all remote cellular phones using channel access methods defined above (with cellular equipment, public switched telephone network lines, satellite, tower and mesh technology), mobile phones, PDAs, tablets (e.g. refers to all current and future variants, revisions and generations of the Apple IPAD, Samsung Galaxy, HP, Acer, Microsoft, Nook, Google Nexus, Sony, Kindle and all future tablets manufactured by these and other manufactures), Apple IPOD Touch, or a television, watch, timepiece or fob watch and other similar apparatus with WIFI and wireless capability, and remote computers and controllers having internet or wireless connectivity. The display of the indoor and irrigation water use data can be in various pleasing format using digits, analog displays, graphics, pictures, charts and/or other characters to exhibit the water use to a user. Also, the transfer of data can use authentication, encryptions, integrity and non-repudiation technology to ensure that data or information is communicated securely. The sensitive water flow sensors, standard invasive flow sensors, (e.g. turbine, Pelton, paddle wheel flow, piston, and pressure sensors and other invasive sensors), non-invasive flow use sensors (e.g. Doppler or time-transit ultrasonic, laser or magnetic flow sensors and other non-invasive flow use sensors) with transceivers can have an extended battery life by utilizing the interval wireless communications or transmissions and with a long lasting battery pack, such as, for example, the Tadiran series of batteries manufactured by Tadiran U.S. Battery in Lake Success, N.Y. Some candidates for use with the present invention water meter and leak detection system 10, 126, 200 are the standard or rechargeable lithium industrial type batteries, $LiSOCl_2$ bobbin or serial type batteries, one or more super capacitors, or $LiSOCl_2$ bobbin type with hybrid supercapacitor. Or with a turbine, paddle wheel or Pelton wheel energy generator 95 in hydraulic communication with the water supply line, solar energy, or wind energy, a rechargeable battery or super capacitor can be utilized. In addition, the batteries can be recharging type and accessed with an electrical coupler accessed from the outside of the sensitive flow sensors with transceivers. Or the flow sensors can be powered by low voltage AC e.g. 24 volts AC, or DC current. High voltage current e.g. 240 or 120 volts can also be used and if necessary, the voltage can be reduced with transformers and the like.

Shown below in this FIG. 10 is a perspective view of an "APP" or programmed application that provides water use data in various example formats that is transferred from the water meter and leak detection system collection node or optional communication hub to a remote display/recording apparatus 18, 50, 56, or a remote computer or a cell phone, smart phone, or similar apparatus 400. The programmed application or APP shows an average time of water use data, average water use data, water cost data, energy calculations using the water heater type, the state located, cost of natural gas or oil per Therm, efficiency information, and the average ambient water temperature and the desired water temperature use for hot water devices (e.g. shower, faucets). On the bottom of FIG. 10 is the water energy calculation and water costs for the day, week, month, year, and 2-year dates. The Applicant contends that many different water energy calculations can be used with the present invention without deviated from its intended use. The water meter and leak detection system 10, 126, 200 can communicate with a said typical cell phone, smart phones, or similar apparatus includes an application for a consumer/resident, corporate entity, or municipality that show the daily, weekly and/or monthly water use and/or daily, weekly or monthly water costs.

Shown in FIG. 11 is a perspective view of a first example application (APP), or a first page of an application (APP) 300, displayed on a typical cell phone, smart phone or similar apparatus 400 (see FIGS. 12 and 13). This example application (APP) or page 300 is designed as a line graph format to be used by the resident of a home or a representative of a company or a corporation to monitor water conservation, but is it anticipated by the Applicant that the application (APP) 300 could be used by municipal or government representatives.

FIG. 11 shows and example of an application or page (APP) 300 for Water Use 302 having a daily 304 graph 306 with day hours 308, designated by the symbol AM 312 and the night hours 310 designated by the symbol PM 314. At the right side of the example application or page (APP) 300 is the daily total use of water 316 and the daily total cost in dollars (or other currency) 318 that has been downloaded the data 340 from the registered or serving water municipality.

Within the daily graph 306 is a plotted line 307 that shows the hourly water use. The plotted line 307 can have a rolling feature whereby new data replaces the oldest data in the graph. A gallon or liter scale can be included on the left side of the daily graph 305 (not shown).

The example of an application or page (APP) 300 for Water Use 302 can also have a weekly 320 graph 322 with days 324. At the right side of the example first application or page (APP) 300 is the weekly total use of water 326 and the weekly total cost in dollars (or other currency) 328 that has been downloaded the data 340 from the registered or serving water municipality. Within the weekly graph 322 is a plotted line 327 that shows the daily water use. The plotted line 327 can have a rolling feature whereby new data replaces the oldest data in the graph. A gallon or liter scale can be included on the left side of the weekly graph 322 (not shown).

The example of an application or page (APP) 300 for Water Use 302 can also have a monthly 334 graph 330 with months 332. At the right side of the example first application or page (APP) 300 is the monthly total use of water 336 and the monthly total cost in dollars (or other currency) 338 that has been downloaded the data 340 from the registered or serving water municipality. Within the monthly graph 330 is a plotted line 337 that shows the daily water use. The plotted line 337 can have a rolling feature whereby new data replaces the oldest data in the graph. A gallon or liter scale can be included on the left side of the monthly graph 330 (not shown).

The water meter and leak detection system 10, 126, 200 is designed to transfer data and information by utilizing the wireless communication with the one or more remote display and/or recorder apparatus, or cell phone, smart phone or similar apparatus whereby the remote display and/or recorder apparatus or cell phone, smart phone or similar apparatus 400 can automatically convert back and forth from radio frequency format, ZigBee or Bluetooth format to a cellular format technology to accommodate different range requirements.

FIG. 11 shows a Download Button 340 which is designed to manually or automatically download water rate and expense data from the servicing and registered water municipality or another source. The cost per gallon, hundred cubic feet (HCF) or other measurement is usually dependent on volume used over a given period. For example, from 0-8 HCF could be billed at $3.64 per HCF, 9-24 HCF could be billed at $4.08 per HCF, and 25-36 HCF could be billed at $5.82 per HCF. This is only an example data that can be downloaded and utilized to determine the daily cost 318, weekly cost 328, or monthly cost 338. Other data can be downloaded from the water municipality or other source such as warnings for drought conditions, metering policies, quality messages, limits, alarms, etc.

FIG. 11 also depicts a user, whether it is a home owner or company representative, who can Set Limits 342 for water use to command the water meter and leak detection system 10, 126, 200 to turn the water completely off for example, if a limit of water flow exceeds a limit, or sound a verbal or audio alarm. It is anticipated that the servicing and registered water municipality or other source can upload Set Limits 342 to the individual water meter and leak detection system 10, 126, 200. In addition, the Set Alarms 344 for water use can be used to display visually or provide audio signals of alarming conditions associated with the daily, weekly or monthly water use. The application (APP) 300 is designed to promote water conservation and monitor for leaking conditions.

FIG. 11 also shows an optional Water Quality section 350 of the application (APP) 300. As shown, optional water quality Sensor 1 (one) 352 can monitor one or more halogen elements or compounds, monitoring total dissolve solids, monitoring a metallic or iron element or compound, monitoring water hardness, monitoring biological or coliform contaminates, monitoring pH, or any combinations thereof. The plotted line 358 for Sensor 1 (one) shows peaks and valley over the time period 360. The time period can be selected for daily, weekly or monthly. Sensor 2 (two) 354, can be another water quality sensor and Sensor X 356 can be one or more water quality sensor taken from the group define above.

For the optional Water Quality sensors 350, shown is a Frequency Soft Button which allows the user to define the time period, daily, weekly or monthly. A user, whether it is a home owner or company representative, who can Set Limits 372 for water quality to command the water meter and leak detection system 10, 126, 200 to turn the water completely off, limit the flow, or sound a verbal or audio alarm. It is anticipated that the servicing and registered water municipality or other source can upload Set Limits 372 to the individual water meter and leak detection system 10, 126, 200 (with water shut-off/on mechanism 310). In addition, the Set Alarms 374 for water use can be used to display visually or provide audio signals of alarming conditions associated with the daily, weekly or monthly water use.

As FIG. 11 is only an example of presentation of the water use and water quality data, it is anticipated that other formats for displaying the daily, weekly, monthly, or annual water use and water quality use. Such formats can be in bar graph format, pie graph format, cosmography formats, tabular formats, time series graph formats, histogram formats, data plot format, scatter plot format, other graph formats, or a combination of these graph formats. In addition, it is anticipated that the water flow data presented in line graphs, tabular formats or graphic formats or any combination of the formats listed herein can be presented on one or more pages or screens of the typical cell phone, smart phone or similar apparatus.

FIG. 12 shows the water meter and leak detection system APP, which manages the water control valve mechanism enabling one to turn the water supply on/off, to program a water on/off schedule, and to receive notification of a leak condition with the option to remotely turn off the water supply. The Water meter and leak detection system's flow sensor(s) 105 can communicate wirelessly or wired 101, 102, 103 with the microprocessor or microcontroller 84 that has software that learns about water usage at a private or public property(ies) or areas thereof.

Referring to FIG. 12, which shows a perspective view of a typical cell phone, smart phones, or similar apparatus 400 having an application 410, commonly known as an "APP", programmed to display soft buttons or use control activators on a cell phone, smart phone, or similar apparatus 400, designed to wirelessly communicate or send signals to and from the water meter and leak detection system 10, 126, 200 with water shut-off/on mechanism 310. It is also anticipated that the apparatus 400 could be an Apple IPAD, HP, Samsung, LG, or other manufacture's tablet and that the application 402 that would function as described below. Furthermore, apparatus 400 could be a remote computer or television that is connected to the internet or has wireless capability. Shown in FIG. 12A is an example of an application 410 which will typically display soft buttons for controlling water on 404 and water off 406 by sending wireless instructions to the water meter and leak detection system 10, 126, 200. It is anticipated by the Applicant that other configuration of application displays for remotely communicating with the water meter and leak detection system 10, 126, 200. The application 410 can also have a soft schedule button 408 which sequentially adds displays for entering a predetermined schedule for turning on and off the water at the collection node of the water meter and leak detection system 10, 126, 200. The predetermined schedule can be sent to the water meter and leak detection system 10, 126, 200 for continuous sequencing operations on an hourly, daily, weekly, monthly or yearly basis. The predetermined schedule can be programmed into a memory module at the water meter and leak detection system 10, 126, 200.

An option of the application 410 is shown as a decisional text message 413 inquiring if the individual would like the water turned off and sent to display 402 of the cell phone, smart phone or similar apparatus 400. The cell phone, smart phone or similar apparatus 400 would preferably have incorporated GPS technology that can determine the location of the cell phone, smart phone or similar apparatus, and know or saved the home of a water meter and leak detection system 10, 126, 200 location(s). Triangulation techniques between cell towers can also be used if the cell phone, smart phone or similar apparatus 400 does not have GPS capability. The application 402 could or will have a routine that can program the distance from the water meter and leak detection system 10, 126, 200 that an individual desire to be provided a notice of the decisional text message. If the water is not turned off when the individual leaves the private or public property(ies), and the cell phone, smart phone or similar apparatus 400 has been programmed for a set distance from the water meter and leak detection system collection node or optional communication hub e.g. mile, then the decisional text message 417, for example, "Should I turn off the water supply", will be sent to the cell phone, smart phone or similar apparatus 400. The rational for the decisional text message is that, for the present invention to function as a water damage prevention system, substantial compliance with routine turning off the water when a private or public property(ies) in unoccupied is necessary. The decisional text message 417 provides the individual a soft button "yes" 412 to turn off the water at the collection node of the Water meter and leak detection system 10, 126, 200 or "no" 414 and leave the collection node of the water meter and leak detection system and leak detection 10, 126, 200 with the water control valve on. Hard button activators 416*a*, 416*b* and 416*c* can also be used to communicate with the water meter and leak detection system 10, 126, 200 that transfers water parameter data to the internet and then to remote computers/servers for cell phones, smart phones or a similar apparatus that a display screens or no touch screen capability. For example, hard button 416*a* can communication with the water meter and leak detection system 10, 126, 200 to turn the water system on, hard button 416*b* can communication with the water meter and leak detection system 10, 126, 200 with water shut-off/on mechanism 310 to turn the water system off, and hard button 416*c* can communication with water meter and leak detection system 10, 126, 200 with water shut-off/on mechanism 310 to open a schedule page.

Another optional decisional text message 410 can sent to the cell phone, smart phone or similar apparatus 400 if one of the optional highly sensitive flow sensors and 123 detects a leaking condition. The text message could specify "Leak found in kitchen area, should I turn of the water supply". The decisional text message 410 provides the individual a soft button "yes" 412 to turn off the water at the water meter and leak detection system 10, 126, 200 or "no" 414 and leave the water meter and leak detection 10, 126, 200 with the water control valve on. Hard button activators 416*a*, 416*b* and 416*c* can also be used to communicate with the water meter and leak detection system 10, 126, 200 for cell phones, smart phones or a similar apparatus that a limited display screens or no touch screen capability. This optional leak detection message could also be sent the insurance or municipality agency monitoring station by PSTN or wireless means to notify of the leakage condition. It is also anticipated by the Applicant that the leak detection message could also be transferred to the supplying municipality to inform them of the leak such that the municipality can act to repair the leak condition.

Shown on the side are the Bluetooth 420A, Wi-Fi 420B and cellular communication 420C means that wirelessly connects the cell phone, smart phone or similar apparatus 400 to the water meter and leak detection system 10, 126, 200.

Typical cell phones, smart phones, and similar apparatuses 400 may have one or more means of communication that can be established with a particular water meter and leak detection system 10, 126, 200 for wireless communication. The use of Bluetooth wireless technology 420*a* is commonly a feature found on many cell phones, smart phones and similar apparatus. Such Bluetooth wireless communication 420*a* can be a means to communicate with the water meter and leak detection system 10, 126, 200 with water shut-off/on mechanism 310 to turn the water on or off or receive decisional text messages 410. Zigbee is another wireless technology that can be used. However, most current cell phones, smart phones or similar apparatus 400 do not possess Zigbee wireless capability.

The use of Wi-Fi (IEEE 802.11 family of wireless local area network) and upcoming Wi-Fi3 wireless technology 420*b* is commonly a feature found on many cell phones, smart phones and similar apparatus 400 and wireless routers/servers. Such Wi-Fi wireless communication 420*b* can be a means to communicate remotely from a router/server directly to, or by the communication hub circuitry to the collection node circuitry of the water meter and leak detection system 10, 126, 200 with water shut-off/on mechanism 310 to turn the water on or off or receive text messages. The water meter and leak detection system 10, 126, 200 can have the capability to receive and transfer wireless signals and decisional text messages 410 using Wi-Fi technology directly to the water meter and leak detection system 10, 126, 200 with water shut-off/on mechanism 310. Alternately, the Wi-Fi communication 420*b* will communicate with a wireless router/server that has a HTML or other communication-based interface and configuration page graphic user interfaces. Remote access from the cell phone, smart phone or similar apparatus 400 could use a short message service (SMS) interface and/or voice of Internet Protocol (VOIP) which communicates with the wireless router. This Wi-Fi technology will access the internet through the wireless router and can recognize the cell phone, smart phone or similar apparatus 400 phone number for remote capability using SMS interface. A digit numbers security can be used to maintain restricted integrity. Wireless Transmitters and Receivers can be used for Wi-Fi communication 420*b* to the water meter and leak detection system 10, 126, 200 for individuals lacking internet capability at their residence.

The use of cellular wireless technology 420*c* is a primary feature of cells phones, smart phones and similar apparatus. Such cellular wireless communication 420*c* can be a means to communicate with the water meter and leak detection system 10, 126, 200 with water shut-off/on mechanism 310 to turn the water on or off or to receive text messages.

The application 410 can have to interface with the Bluetooth 420a, WIFI 420b, or cellular 420c wireless communication means, and send instructions to a specific "paired" water meter and leak detection system 10, 126, 200 with water shut-off/on mechanism 130. Various pairing methods between the water meter and leak detection system 10, 126, 200 with water shut-off/on mechanism 310 and the cell phone, smart phone or similar apparatus 400 are contemplated to be necessary to ensure that proper communication is established between a single and unique water meter and leak detection system 10, 126, 200 in addition to one or more unique cell phone, smart phone or similar apparatus 400. A Quick Response Code (QR code) unit address located on water meter and leak detection system 10, 126, 200 can communicate with a cell phone, smart phone or similar apparatus 400 having a camera to read QR and establish link to the water meter and leak detection system 10, 126, 200. Standard barcodes could be pair and establish a link between the water meter and leak detection system 10, 126, 200 with water shut-off/on mechanism 310 and the cell phone, smart phone or similar apparatus 400. Near field link and RFID chip technology can also be used to facilitate pairing and establish a link between the water meter and leak detection system 10, 126, 200 and the cell phone, smart phone or similar apparatus 400. Currently bar code readers are applications that can be downloaded for a cell phone, smart phone or similar apparatus 400 operation system. Near field links are only recently becoming available on Samsung smart phones, but this technology may be expanded to many, if not all, cell phones, smart phones or similar apparatus.

In operation, an individual who wants to turn off the water system would touch the off the soft button 408 or reply to the text message to turn off the water system "yes" soft button 412, or push the hard button 416b on the a cell phone, smart phone or similar apparatus 400 which will communication with the water/energy use monitoring display apparatus 10, 200 via the internet, wireless technology (e.g. Bluetooth, ZigBee, WiFi3, LoRa), and/or cellular format technology and then the paired water meter and leak detection system 10, 126, 200 with water shut-off/on mechanism 310 would turn off the water system off and then when completed (specified by switches and/or a flow sensor) will send a returned communication signal to the a cell phone, smart phone or similar apparatus 400 and turn on signal (audio or visual) message 409 that the water system is off. Comparable, an individual who wants to turn on the water system would touch the "on" the soft button 404 or reply to the text message to turn off the water system 410 "no" soft button 412, or push the hard button 416a on the a cell phone, smart phone or similar apparatus 400 which will communication with water meter and leak detection system 10, 126, 200 with water shut-off/on mechanism 310 via the internet, wireless technology (e.g. Bluetooth, ZigBee, Wi-Fi3, LoRa), and/or cellular format technology and then the paired water meter and leak detection system 10, 126, 200 would turn off the water system off and then when completed (specified by switches and/or a flow sensor) will send a returned communication signal to the a cell phone, smart phone or similar apparatus 400 and turn on signal (audio or visual) message 409 that the water system is off.

FIG. 13 shows another example of a cell phone, smart phone or similar apparatus 400 having an "APP" or programmed application, or another page of an "APP" or programmed application to display the soft buttons or control activators to turn on/off the water system, schedule the water control mechanism, or receive a text message that utilizes the technology and functionality as previously described. On the top are soft buttons to select data for a day, week, month or year for the exemplary pie chart format 422 showing the total volume distribution of water use devices, irrigation 421 at 27 gals., toilet 423 at 9 gals., shower 425 at 8 gals., and washing machine 427 at 10 gals. The exemplary pie chart can use other format such as bar charts, line charts, cluster charts, historical combo chart and other graphically displays. This display of water used by the water use devices utilizes water flow rate, water use duration, total water volume data and optional pressure and acoustic technology in software calculations that generates water use patterns or water signatures for leak detection and/or displaying water use and/or water quality information or data on a cell phone, smart phone, mobile phone, computer or similar electronic apparatus. Below is a Leak Detection icon showing an example "happy face" indication that no leaks have been detected. Obviously, it is anticipated that may other icons or data may be used instead of the "happy face" icon. On the bottom of the APP page are soft buttons for program, setting and default selections 424 which would be bring up sub-menus with various programming features and settings. The cell phone, smart phone, or similar apparatus 400 communicates with the water meter and leak detection system 10, 126, 200 using Bluetooth or ZigBee wireless technology 420a, Wi-Fi wireless communication 420b, WiFi3, LoRa and/or cellular wireless technology 420c.

The program (or setting) buttons can be used to program a "sensor calibration stage" or an "Automatic Sensor Learning Mode". In the "sensor calibration stage" example, an owner/user can enter into a programmed "sensor calibration stage" by pressing a specific hard or soft button on the water meter and leak detection system 10, 126, 200 or touch screen display 80, or make a verbal or annunciation command or communication with the central audio hub having intelligent listening and speaker capabilities (FIGS. 15-170, 172, 174, 176 and 178), and/or another remote device such as a cell phone, smart phone, or similar apparatus 400, or to a remote computer. This embodiment does not utilize wired or wireless technology incorporated for each water flow sensor. Since independent water valves has unique pressures and sounds patterns when being closed or opened, optional sensitive pressure sensor and optional acoustic/sound monitoring devices will be incorporated into the water meter and leak detection system 10, 126, 200 and functions to assist identify the independent water sensor and/or valve. In this first phase, the user independently turns on one water apparatus (e.g. washing machine) for a limited time period and the calibration software determines the flow rate for that independent flow sensor 105. The user continues these steps for each independent flow sensor 95 until all flow sensors 105 (e.g. mains water supply, irrigation system, washing machine, water heater, dishwasher, kitchen, bathroom faucets, toilets) are calibrated. The software can use the calibration data for each flow sensor 105 and record its pattern (actual independent flow rates, variation of flow rate over time, expected duration, variations in pressure patterns (e.g. rate of flow at onset of water flow and rate of flow when turned off, and any variations during water flow duration, and optional acoustic/sound frequency) to assign the pattern of water use to a particular flow sensor. Then, when water use data can be communicated to a display and/or a recording apparatus 50, 110 and/or cell phone, smart phone, or similar apparatus 400, or to a remote computer, the independent flow rates and water use can be displayed appropriately.

In the "Automatic Sensor Learning Mode", the software learns about a family's or corporation's water use with or without the calibration steps. In this embodiment, a single sensitive water flow sensor located at the water meter and leak detection system 10, 126, 200 can be located at or near the water meter and leak detection system 10, 126, 200. Since independent water valve 105 has unique pressures 65 and sounds patterns when being closed or opened, optional sensitive pressure sensor and optional acoustic/sound monitoring devices will be incorporated into the water meter and leak detection system 10, 126 and functions to assist identify the independent water valve. A user can enter into a programmed "Automatic Sensor Learning Mode" by pressing a specific hard or soft button on the water meter and leak detection system 10, 126, 200 or touch screen display 80, or make a verbal or annunciation command or communication with the central audio hub having intelligent listening and speaker capabilities (FIGS. 15-170, 172, 174, 176 and 178), and/or another remote device such as a cell phone, smart phone, or similar apparatus 400, or to a remote computer which initiates the software to monitor the water use that occurs during the next weeks or months, and during this period the learning software enters an aggressive learning phase. In this phase, it privately tracks your water use during a day/week/month, and the water use volume and during at each independent flow sensors (e.g. sensitive flow sensors for the mains water supply, irrigation system, washing machine, water heater, dishwasher, kitchen and bathroom faucets), times when you are home and not home, and remembers the different water use you use at during different times of the day and days of the week. For example, after a period of time, learning the individual flow sensor water use, the flow sensor has determined that the washing machine can determine the range of water flow used analyzed by software records the water flow pattern (actual independent flow rates, variation of flow rate over time, expected duration, variations in pressure patterns (e.g. rate of flow at onset of water flow and rate of flow when turned off, and any variations during water flow duration, and optional acoustic/sound frequency) during the duration of water use and determine timing parameters, and optionally acoustic/sound frequency patterns to identify the particular washing machine water use. In another example, generally after a toiled is flushed (and the software recognized the toilet and bathroom faucet water use pattern), usually within a minute or two the bathroom faucet would turn on (to wash one's hands), software can identify the pattern, water use and timing parameters, and optionally use acoustic/sound frequency patterns to identify the toilet(s) and bathroom faucet(s). The automatic learning software could analyze, record, and store actual independent flow rates, variation of flow rate over time, typical durations, variations in pressure patterns (e.g. rate of flow at onset of water flow and rate of flow when turned off, and any variations during water flow duration, and optional acoustic/sound frequency) to assign the pattern of water use for the toilet and bathroom faucet. In another example, either during or soon after a shower (and the software recognized the shower water use pattern), the hot water heater begins using water to replenish the hot water used for the shower. The automatic learning software can analyze, record and store actual independent flow rates, variation of flow rate over time, expected duration, variations in pressure patterns (e.g. rate of flow at onset of water flow and rate of flow when turned off, and any variations during water flow duration, and optional acoustic/sound frequency) to assign the pattern of water use to a particular flow sensor for the shower and hot water heater. Irrigation watering usually occurs at a regular pattern (generally in the morning or evening hours) and the learning software could record and store two flow and duration patterns for irrigation. The automatic learning software could record and store actual independent flow rates, variation of flow rate over time, expected duration, variations in pressure patterns (e.g. rate of flow at onset of water flow and rate of flow when turned off, and any variations during water flow duration, and optional acoustic/sound frequency) to assign the pattern of water use to a particular flow sensor for the shower and hot water heater. Then, when water use data can be communicated to a cell phone, smart phone, or similar apparatus 400, or to a remote computer, the independent flow rates and water use can be displayed appropriately.

FIG. 14 is block diagram of the overall system showing the software, hardware and software applications of the private or public property(ies) communicating with the water meter and leak detection system 10, 126, 200 and communicating with the internet and remote computer service station ("the Cloud"). The water meter and leak detection system 10, 126, 200 (with water shut-off/on mechanism 310) includes, a preferred, but optional receiving station or communication hub 477 that connects either hard wired or wireless to a router/server 438 which connects in a duplex communication 440, 441 to the internet 434. The internet has duplex communication 461, 462 with the Remote Computer/ Server Service Center 452 (e.g. Amazon®, Microsoft®, Oracle® and Google®). Within the Remote Computer/ Server Service Center communicating with a cell or mobile phone, smart phone, or similar apparatus 400, smart internet TVs, smart central hub listening and speaker devices, and home control systems (408). At a user's private or public property(ies), the water meter and leak detection system 10, 126, 200 (with water shut-off/on mechanism 310) connects to the router/server 438 with authentication, and preferable encrypted data. The water meter and leak detection system 10, 126, 200 (with water shut-off/on mechanism 310) system communicates with the remote computers 452 located in the service provider's data center or hosted in integrated security system data center), with the communication taking place via a communication network (e.g., cellular network, private or corporate network, internet, etc.).

The cell or mobile phone, smart phone, or similar apparatus 400, computer, cell phone, smart phone and similar apparatus, smart internet TVs, smart central hub listening and speaker devices, and home control systems, is used to wirelessly communicate with the water meter and leak detection system 10, 126, 200 (with water shut-off/on mechanism 310) via router/internet/remote servers. The cell or mobile phone, smart phone, or similar apparatus 400, computer, cell phone, smart phone and similar apparatus, smart internet TVs, smart central hub listening and speaker devices, and home control systems, preferably have downloaded programs or applications ("APPs") that communicated with the water meter and leak detection system 10, 126, 200 (with water shut-off/on mechanism 310) for displaying water use, energy use and water quality as described herein. The cell or mobile phone, smart phone, or similar apparatus 400, computer, cell phone, smart phone and similar apparatus, smart internet TVs, smart central hub listening and speaker devices, and home control systems, that downloaded program or applications ("APPs") can specifically turning on and off the water supply to a private or public property(ies) when it is not occupied either directly using a soft button of the APP or program a schedule using the APP. The water meter and leak detection system 10, 126, 200 (with water shut-off/on mechanism 310) is not only designed to monitor for water use, energy use, and water quality, but to monitor of leak detection conditions and provide text messages, alerts signals, or emails regarding water leak conditions. The water meter and leak detection system 10, 126, 200 (with water shut-off/on mechanism 310) can be programmed by the user to automatically shut off the water supply when a leak condition is observed. For purposes of brevity, water use data, water energy data, water quality data and leak detection signals and alerts utilizing the communication means described below.

The following remote computer components manage the main elements of the remote computer service, but this only exemplary and is not so limited. Several of the component defined and described can be replaces by a newly design operation(s), combine operations, or eliminate some operation(s). Professional companies, such as Amazon Web Services, handle most if not all of, the OSS and BSS services, database access, connectivity and database maintenance (e.g. SQL databases like MySQL, MariaSQL, and Aurora, Redshift, and non-SQL databases like Dynamodb), server component access and maintenance and load balancing, all for a cost base on various factors. Data access by cell phones, mobile phones, and similar apparatus 400, and remote computers can access the commercial database using certain protocols.

There are large cloud-computing companies with several computer server farms around the world that supplant the independent comprehensive internet infrastructure and communication network. Companies like Amazon®, Microsoft®, Oracle® and Google® have all built a significant quantity of computing infrastructure. Their data centers are vastly bigger, and significantly more efficient, than those operated by or could be built by most other independent companies. The cloud-computing companies with their worldwide server farms allow for scalable and redundant data storage capabilities (Redundant Array of Independent Disks or RAID technology). The large cloud-computer companies can temporarily extend or customize the functionality for a client by transferring logic to it that it can execute. Examples of this may include compiled components such as Java applets and client-side scripts such as JavaScript. Complying with these constraints, and thus conforming to the REST architectural style (REST an acronym for REpresentational State Transfer), which will enable any kind of distributed hypermedia system to have desirable emergent properties, such as performance, scalability, simplicity, modifiability, visibility, portability and reliability (RestAPI). These large companies are presently marketing and rented out their computing capacity to developers and companies around the world. The developer or company doesn't have to incur the capital expense associated with designing network connectivity system, employing various Information technology (IT) professionals, purchasing the necessary computers and servers, developing the custom and non-custom software and conducting the significant maintenance procedures.

A programmer/developer or a company simply pays for the cloud-computing services. Using the cloud-computing services provide the developer and company access to fundamentally unlimited computing power marketed by the cloud computing companies without must incur the expenses for developing and maintaining a private or corporate computer infrastructure.

There are various services, divided into certain categories, that are provided by the cloud computing companies. Infrastructure as a Service, or "IaaS," is the most basic layer of cloud computing. It provides customers with virtual servers and database storage and Internet of Things (IoT) sensor communication and access. Platform as a Service, or "PaaS," which is the set of application tools and services that make it easier for developers and IT professionals to build applications without the capital expense of purchasing software for application development. Software as a Service, or SaaS, which refers to applications that run in the cloud like Microsoft's Office 365, Google's G Suite and Salesforce's products for sales and marketing.

The plan for a cloud-computing companies is to make their services indispensable to both independent software developers and small, medium and large companies. Customers might venture into cloud computing with a single software application (APP) but as their businesses grow, their cloud-computer needs increase and the cloud-computing service companies are expecting that their cloud usage and revenue will increase. Amazon® has increased their presence in the cloud industry, by sacrificing short term profits to enhance the customer experience and maximize long-term gain. The more customers a cloud platform provider contracts with, the more servers and serving farms under their control can be developed. And the more servers the cloud-computing companies have, the better they can take advantage of economies of scale and offer customers lower prices for more robust features, including appeal to large enterprises. The efforts to market cloud-computing services supports that the near future of internet infrastructures and communication networks will increasing be controlled and maintained by the large cloud-computing companies.

Specific communication protocols are becoming important to interface between the cloud-computing companies and the company's local or cloud database for computer, cell phone, smart phone and similar apparatus, smart internet TVs, smart central hub listening and speaker devices, and home control systems, access to acquire requested data (e.g. SQL database requests) and perform instructional activities (turn on/off water). Of these protocols, the Representational state transfer or RestAPI (or REST API), SOAP API, Java API or XML API seem to be appropriate.

To begin wireless communication, a pairing operation will be necessary that utilizes the SSID and password, QR code, or more current two-way authentication protocol. This may be necessary for wirelessly connecting the water meter and leak detection system 10, 126, 200 to a local router, connecting the water meter and leak detection system 10, 126, 200 to home automation device or wireless thermostat, or communicating between the water meter and leak detection system 10, 126, 200 and the audio central hub having intelligent listening and speaker apparatus. Once a user sets up a service, an activation application 494 delivers a first display to the user on either a display means of the computer, cell phone, smart phone, mobile phone or similar apparatus 400, computer, cell phone, smart phone and similar apparatus, smart internet TVs, smart central hub listening and speaker devices, and home control systems, on the water meter and leak detection system 10, 126, 200 and/or on a display means on the remote devices 480. This pairing technology or other application secure means associates a new user with a purchased or installed remote device and the water meter and leak detection system 10, 126, 200.

A number of applications provided by the large cloud-computing companies ensure overall management of the computer infrastructure and network service. These predefined applications are configured to offer off-the-shelf programs and operating systems solutions management of the integrated cloud-computing system service, overall service monitoring, customer support, and reporting.

FIG. 15 shows various audio central hub having intelligent listening and speakers such as Amazon Echo 176 and Echo dot which utilizes software Alexa, Google Home 174 uses Google Assistant software, Apple HomePod 170, 172 utilizes Siri software and Harmon Kardon 178 uses Microsoft Cortana software. The audio central hub having intelligent listening and speakers are continuing evolving so it is anticipated that the FIG. 15 is only exemplary. Each audio central hub having intelligent listening and speakers all work in much the same way, but they don't work together. All voice assistants use cloud computing for voice recognition and responding to queries and demands. Each audio central hub having intelligent listening and speakers that are connected to the internet to function properly. Informational requests or audio commands are sent to Amazon, Apple, Microsoft or Google remote related servers, which find an answer(s) to a user's information requests or connect with the services requested and/or send the proper response back to the audio central hub speaker. Also processed information (e.g. schedules) and/or audio commands (e.g. turn off water supply) can be transmitted from the audio central hub having intelligent listening and speaker capabilities to the collection nods or communication hub. The audio central hub having intelligent listening and speaker capabilities is in wireless communication one or more routers, gateways or similar networking devices that communicate with the one or more related remote cloud or web-based computer or servers and in communication with said collection node or communication. The present invention water meter and leak detection system 10, 126, 200 that is connected to the home or corporation router can receive commands from the audio central hub having intelligent listening and speaker to make changes to the software e.g. change water and vacation schedules, turn water off/on. The initializing words or phrases are sent to the Amazon's, Apple's, Harmon Kardon and other central audio hub having intelligent listening and speaker capabilities so that the commands or request for information only is transferred to the specific and cloud or specific web site associated with the particular central audio hub having intelligent listening and speaker capabilities. Amazon's word "Alexa" only connects to Amazon's cloud system or central audio web site, "Siri" only connects to Apple's cloud system or central audio web site, and Cortana utilizes the Microsoft cloud system or central audio web site.

Home Automation is gaining market acceptance and there are advantages to the smart water meter and leak detection systems to communicate with home automation equipment. The company Nest makes thermostats and cameras that communicates with your wireless router and the internet for cell phone control. The present invention water meter and leak detection system 10, 126, 200 can communication with wireless thermostats and home automation devices for command activities, e.g. turn on the heat to 45 degrees F. to keep inside water pipes from freezing.

While this invention has been described as having a preferred design, the present invention can be further modified within the spirit and scope of this disclosure. The application is therefore intended to cover any variations, uses, or adaptations of the invention using its general principles. Further, this application is intended to cover such departures from the present disclosure that arise from known or customary practice and the art to which this invention pertains, and which fall within the limits of the appended claims.

The invention claimed is:

1. A water meter and leak detection system comprising:
   a collection node interposed between a commercial or municipality water supply and a water supply for said building or structure;
   electrical circuitry including one or more CPUs, microprocessors or microcontrollers with a power source in communication with said collection node;
   said power source is either AC powered, DC powered, or powered with one or more batteries, said power source is electrically connected to said electrical circuitry;
   said collection node having one or more flow sensors in connection with a water supply, said one or more flow sensors in electrical communication with said electrical circuitry;
   at least one of a Bluetooth, Bluetooth Low Energy, Wi-Fi, WiFi3, Zigbee, Z-Wave, LoRa, Sigfox, Ultra Narrow Band (UNB), WiMAX, 6LoWPAN wireless technology radios having the capability to transfer water parameter, water energy and/or water quality information or data to one or more remote apparatuses to a router, gateway, network bridge or similar networking device with an internet connection to one or more remote computers or servers, or through a private or corporate owned network system which includes or communicates with a water related cloud system or web-based computer with one or more databases;
   said collection node water can optionally include mesh-enabled circuitry that can communicate with other collection nodes for transferring at least one of a water use, flow rate, water energy and water quality information or data;
   an audio central hub having intelligent listening and speaker capabilities located within a residence, corporate or building environment;
   said audio central hub having intelligent listening and speaker capabilities in wireless communication with said collection node;
   said audio central hub having intelligent listening and speaker capabilities in communication with one or more routers, gateways or similar networking devices that communicate with one or more related remote cloud or web-based computer or servers;
   said audio central hub having intelligent listening and speaker capabilities can transmit information requests or audio commands to said one or more remote cloud or web-based computers;
   said one or more remote cloud or web-based computer or servers processing the information requests and audio commands and transmits said processed information or instructional commands to said audio central hub having intelligent listening and speaker capabilities; and
   said audio central hub having intelligent listening and speaker capabilities can reproduce processed information on its speaker or transmit said processed information or an instructional command to said collection node.

2. The water meter and leak detection system of claim 1, wherein said water meter and leak detection system include program instructions to communicate with the audio central hub having intelligent listening and speaker capabilities apparatus, to monitor and control a home automation network or a wireless thermostat.

3. The water meter and leak detection system of claim 1, wherein said audio signal or verbal instruction "on" spoken expressed to the audio central hub having intelligent listening and speaker capabilities can be programmed to send an command signal or instruction for the water meter and leak detection system turn on the supply water and wherein said audio signal or verbal instruction "off" to the audio central hub having intelligent listening and speaker capabilities can be programmed to send an command signal or instruction for the water meter and leak detection system to turn off the supply water.

4. The water meter and leak detection system of claim 1, wherein the audio central hub having intelligent listening and speaker capabilities can be programmed, to send a signal or instruction to said water meter and leak detection system to enter a "Sensor Calibration Stage" or an "Automatic Sensor Learning Mode".

5. The water meter and leak detection system of claim 1, wherein said audio signal or verbal instruction comprising of at least one of a "set a work schedule", "program a work schedule", "set a vacation schedule", "program a vacation schedule", "set a vacation schedule but maintain the irrigation schedule", and "program a schedule but maintain the irrigation schedule" can be programmed into the audio central hub having intelligent listening and speaker capabilities can be programmed to recognize and process these commands to the water meter and leak detection system.

6. The water meter and leak detection system of claim 1, wherein the water meter and leak detection system communicates with or through an audio central hub having intelligent listening and speaker capabilities to a wireless router to a home control device.

7. The water meter and leak detection system of claim 6, wherein the home control device is a wireless thermostat.

8. The water meter and leak detection system claim 1, wherein the audio central hub having intelligent listening and speaker capabilities can be programmed to respond to various audio signals or verbal instructions to facilitate operating, programming, or receiving information from the water meter and leak detection system.

9. A water meter and leak detection system comprising:
a collection node interposed between a commercial or municipality water supply and a water supply for said building or structure;
electrical circuitry including one or more CPUs, microprocessors or microcontrollers with a power source in communication with said collection node;
said power source is either AC powered, DC powered, or powered with one or more batteries, said power source is electrically connected to said electrical circuitry;
said collection node having one or more flow sensors in connection with a water supply, said one or more flow sensors in electrical communication with said electrical circuitry;
at least one of a Bluetooth, Bluetooth Low Energy, Wi-Fi, WiFi3, Zigbee, Z-Wave, LoRa, Sigfox, Ultra Narrow Band (UNB), WiMAX, 6LoWPAN and cellular wireless technology radios having the capability to transfer at least one of a water use, water energy and water quality information or data to a communication hub;
the collection node water can optionally include mesh-enabled circuitry that can communicate with other collection nodes for transferring at least one or a water use, flow rate, water energy and water quality information or data;
the communication hub, said communication hub having electrical circuitry including one or more CPUs, microprocessors or microcontrollers with a power source in communication with said communication hub;
said communication hub having at least one of a Bluetooth, Bluetooth Low Energy, Wi-Fi, WiFi3, Zigbee, Z-Wave, LoRa, Sigfox, Ultra Narrow Band (UNB), WiMAX, 6LoWPAN and cellular wireless technology radios, said at least one of a Bluetooth, Bluetooth Low Energy, Wi-Fi, WiFi3, Zigbee, Z-Wave, LoRa, Sigfox, Ultra Narrow Band (UNB), WiMAX, 6LoWPAN and cellular wireless technology that communicates with the collection hub radio to receive at least one of a water use, flow rate, water energy and water quality information or data;
said communication hub having at least one of a Bluetooth, Bluetooth Low Energy, Wi-Fi, WiFi3, Zigbee, Z-Wave, LoRa, Sigfox, Ultra Narrow Band (UNB), WiMAX, 6LoWPAN and cellular second wireless technology having the capability to transfer water parameter, water energy and/or water quality information or data to a router, gateway, network bridge or similar networking device with an internet connection to one or more remote computers or servers, or through a private or corporate owned network system w includes or communicates with a water related cloud system or web-based computer with one or more databases;
said communication hub can optionally include mesh-enabled circuitry that can communicate with other collection nodes or communication hubs for transferring at least one or a water us flow rate, water energy and water quality data;
an audio central hub having intelligent listening and speaker capabilities and located within a residence, corporate or building environment;
said audio central hub having intelligent listening and speaker capabilities in wireless communication with said communication hub;
said audio central hub having intelligent listening and speaker capabilities in communication with one or more routers, gateways or similar networking devices that communicate with one or more related remote cloud or web-based computer or servers;
said audio central hub having intelligent listening and speaker capabilities can transmit information requests or audio commands to said one or more remote cloud or web-based computers;
said one or more remote cloud or web-based computer or servers processing the information requests and audio commands and transmits said processed information or audio commands to said audio central hub having intelligent listening and speaker capabilities;
said audio central hub having intelligent listening and speaker capabilities can reproduce said processed information on its speaker or transmit said processed information or an instructional command to said communication hub; and
said communication hub processes the information or instructional command and send an appropriate information or instructional command to said collection node.

10. The water meter and leak detection system of claim 9, wherein said audio signal or verbal instruction "on" expressed to the audio central hub having intelligent listening and speaker capabilities can be programmed to send an command signal or instruction for the water meter and leak detection system turn on the supply water and wherein said audio signal or verbal instruction "off" to the audio central hub having intelligent listening and speaker capabilities can be programmed, to send an command signal or instruction for the water meter and leak detection system to turn off the supply water.

11. The water meter and leak detection system of claim 9, wherein any audio signal or verbal instruction comprising of at least one of a "set a work schedule", "program a work schedule", "set a vacation schedule", "program a vacation schedule", "set a vacation schedule but maintain the irrigation schedule", and "program a schedule but maintain the irrigation schedule" can be programmed into the audio central hub having intelligent listening and speaker capabilities can be programmed to recognize and process these commands to the water meter and leak detection system.

12. The water meter and leak detection system of claim 9, wherein the audio central hub having intelligent listening and speaker capabilities has software that recognizes various audio or verbal commands that uses descriptive words and phrases and has software instructions associated with the descriptive words and/or phrases that performs specific activities or operations on the water and leak detection system.

13. The water meter and leak detection system of claim 9, wherein the water meter and leak detection system communicates with or through an audio central hub having intelligent listening and speaker capabilities to a wireless router to a home control device.

14. The water meter and leak detection system of claim 13, wherein the home control device is a wireless thermostat.

15. The water meter and leak detection system of claim 13 where the water meter and leak detection system is capable of sending a signal to, or through the audio central hub having intelligent listening and speaker capabilities to the wireless thermostat home control device when a freezing condition exists to turn on the heater.

16. The water meter and leak detection system of claim 9, wherein the audio central hub having intelligent listening and speaker capabilities can be programmed to respond to various audio signals or verbal instructions to facilitate operating, programming, or receiving information from the water meter and leak detection system.

17. The water meter and leak detection system of claim 16 where the water meter and leak detection system is capable of sending a signal to, or through the audio central hub having intelligent listening and speaker capabilities to the wireless thermostat home control device when a freezing condition exists to turn on the heater.

18. The water meter and leak detection system of claim 9, wherein the audio central hub having intelligent listening and speaker capabilities can be programmed to send a signal or instruction to said water meter and leak detection system to enter a "Sensor Calibration Stage" or an "Automatic Sensor Learning Mode".

19. The water meter and leak detection system of claim 9, wherein the audio central hub having intelligent listening and speaker capabilities can be programmed to respond to various audio signals or verbal instructions to facilitate controlling, programming, or receiving information from the water meter and leak detection system.

20. The water meter and leak detection system of claim 9, wherein said water meter and leak detection system include program instructions to communicate with the audio central hub having intelligent listening and speaker capabilities apparatus, to monitor and control a home automation network, or a wireless thermostat.

21. A shower controller comprising:
one or more displays and one or more control buttons;
electrical circuitry including one or more CPUs, microprocessors or microcontrollers with a power source;
said power source is either AC powered, DC powered, or powered with one or more batteries said power source is electrically connected to said electrical circuitry;
one or more water valves in communication interposed between a water supply and one or more shower heads and in electrical communication with the electrical circuitry;
said shower controller having one or more flow sensors in connection with the water supply and in electrical communication with said electrical circuitry;
said shower controller having one or more temperature sensors connection with the water supply electrical communication with said electrical circuitry;
at least one of a Bluetooth, Bluetooth Low Energy, Wi-Fi, WiFi3, Zigbee, Z-Wave, LoRa, Sigfox, Ultra Narrow Band (UNB), WiMAX, 6LoWPAN wireless technology radios, said Bluetooth, Bluetooth Low Energy, Wi-Fi, WiFi3, Zigbee, Z-Wave, LoRa, Sigfox, Ultra Narrow Band (UNB), WiMAX, 6LoWPAN, and cellular wireless technology radios having the capability to wirelessly communicate with an audio central hub having intelligent listening and speaker capabilities;
said audio central hub having intelligent listening and speaker capabilities can be programmed to transmit information requests or audio commands directly to the shower controller or to one or more remote cloud or web-based computers;
the one or more remote cloud or web-based computers can be programmed to process the information requests and audio commands and transmits said processed information or instructional commands to said audio central hub having intelligent listening and speaker capabilities; and
said audio central hub having intelligent listening and speaker capabilities can reproduce processed information on its speaker or transmit said processed information or instructional commands to the shower controller.

* * * * *